(12) United States Patent
Plesko et al.

(10) Patent No.: US 7,788,652 B2
(45) Date of Patent: Aug. 31, 2010

(54) REPRESENTING TYPE INFORMATION IN A COMPILER AND PROGRAMMING TOOLS FRAMEWORK

(75) Inventors: Mark Ronald Plesko, Kirkland, WA (US); David Read Tarditi, Jr., Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 803 days.

(21) Appl. No.: 10/624,705

(22) Filed: Jul. 21, 2003

(65) Prior Publication Data

US 2004/0268307 A1  Dec. 30, 2004

Related U.S. Application Data

(63) Continuation-in-part of application No. 10/607,591, filed on Jun. 27, 2003.

(51) Int. Cl.
G06F 9/45 (2006.01)
G06F 9/44 (2006.01)

(52) U.S. Cl. .................. 717/146; 717/116; 717/166

(58) Field of Classification Search .................. None
See application file for complete search history.

(56) References Cited

U.S. PATENT DOCUMENTS

| | | | |
|---|---|---|---|
| 4,734,854 A | 3/1988 | Afshar |
| 5,339,419 A | 8/1994 | Chan et al. |
| 5,355,491 A | 10/1994 | Lawlor et al. |
| 5,488,727 A | 1/1996 | Agrawal et al. |
| 5,577,253 A | 11/1996 | Blickstein |
| 5,598,560 A | 1/1997 | Benson |
| 5,628,016 A | 5/1997 | Kukol |
| 5,659,753 A | 8/1997 | Murphy |
| 5,696,974 A | 12/1997 | Agrawal et al. |

(Continued)

FOREIGN PATENT DOCUMENTS

EP  0 463 583  1/1992

(Continued)

OTHER PUBLICATIONS

"Inside Microsoft .NET IL Assembler", Feb. 6, 2002. Online retrieved at <http://proquest.safaribooksonline.com/0735615470>.*

(Continued)

Primary Examiner—Tuan Q Dam
Assistant Examiner—Thuy Dao
(74) Attorney, Agent, or Firm—Klarquist Sparkman, LLP

(57) ABSTRACT

A representation of types, type-checker, method and compiler are provided for checking consistency in various forms of an intermediate language. Specifically, the typed intermediate language is suitable for use in representing programs written in multiple (heterogeneous) source languages including typed and untyped languages, loosely and strongly typed languages, and languages with and without garbage collection. Additionally, the type checker architecture is extensible to handle new languages with different types and primitive operations. The representation of types can be implemented as a data structure that represents two or more sets of types with one or more sub-structures for representing classifications of types. Alternatively, the type system can be implemented as a base class at the top of a hierarchy and a plurality of classes hierarchically below the base class can be defined to represent a number of types such as pointer types, container types, and function types.

29 Claims, 8 Drawing Sheets

U.S. PATENT DOCUMENTS

| | | | |
|---|---|---|---|
| 5,742,828 | A | 4/1998 | Canady et al. |
| 5,754,858 | A | 5/1998 | Broman et al. |
| 5,768,595 | A | 6/1998 | Gillies |
| 5,778,233 | A | 7/1998 | Besaw et al. |
| 5,857,105 | A | 1/1999 | Ayers et al. |
| 5,918,235 | A | 6/1999 | Kirshenbaum et al. |
| 5,937,195 | A | 8/1999 | Ju et al. |
| 5,943,499 | A | 8/1999 | Gillies et al. |
| 5,966,702 | A | 10/1999 | Fresko et al. |
| 5,999,739 | A | 12/1999 | Soni et al. |
| 6,009,273 | A | 12/1999 | Ayers et al. |
| 6,041,179 | A | 3/2000 | Bacon et al. |
| 6,070,011 | A | 5/2000 | Liu et al. |
| 6,131,187 | A | 10/2000 | Chow et al. |
| 6,148,302 | A | 11/2000 | Beylin et al. |
| 6,149,318 | A | 11/2000 | Chase et al. |
| 6,151,703 | A | 11/2000 | Crelier |
| 6,182,284 | B1 | 1/2001 | Sreedhar et al. |
| 6,202,204 | B1 | 3/2001 | Wu et al. |
| 6,212,672 | B1 | 4/2001 | Keller et al. |
| 6,247,169 | B1 | 6/2001 | DeLong |
| 6,247,172 | B1 | 6/2001 | Dunn et al. |
| 6,249,910 | B1 | 6/2001 | Ju et al. |
| 6,253,304 | B1 | 6/2001 | Hewitt et al. |
| 6,286,134 | B1 | 9/2001 | Click et al. |
| 6,289,446 | B1 | 9/2001 | Nilsson |
| 6,292,938 | B1 | 9/2001 | Sarkar et al. |
| 6,330,717 | B1 | 12/2001 | Raverdy et al. |
| 6,353,924 | B1 | 3/2002 | Ayers et al. |
| 6,363,522 | B1 | 3/2002 | Click et al. |
| 6,374,368 | B1 | 4/2002 | Mitchell et al. |
| 6,381,738 | B1 | 4/2002 | Choi et al. |
| 6,412,020 | B1 | 6/2002 | Leach et al. |
| 6,412,109 | B1 | 6/2002 | Ghosh |
| 6,421,667 | B1 | 7/2002 | Codd et al. |
| 6,460,178 | B1 | 10/2002 | Chan et al. |
| 6,463,581 | B1 * | 10/2002 | Bacon et al. ............... 717/154 |
| 6,481,008 | B1 | 11/2002 | Chaiken et al. |
| 6,484,312 | B1 * | 11/2002 | Morrison ................. 717/146 |
| 6,487,716 | B1 | 11/2002 | Choi et al. |
| 6,526,570 | B1 | 2/2003 | Click et al. |
| 6,560,774 | B1 * | 5/2003 | Gordon et al. ............. 717/146 |
| 6,578,090 | B1 * | 6/2003 | Motoyama et al. ......... 719/315 |
| 6,598,220 | B1 * | 7/2003 | Valys et al. ................ 717/116 |
| 6,625,804 | B1 | 9/2003 | Ringseth et al. |
| 6,625,808 | B1 | 9/2003 | Tarditi |
| 6,629,312 | B1 | 9/2003 | Gupta |
| 6,634,023 | B1 | 10/2003 | Komatsu et al. |
| 6,662,356 | B1 | 12/2003 | Edwards et al. |
| 6,678,805 | B1 | 1/2004 | Corduneanu et al. |
| 6,738,967 | B1 | 5/2004 | Radigan |
| 6,745,383 | B1 | 6/2004 | Agarwal et al. |
| 6,748,584 | B1 | 6/2004 | Witchel et al. |
| 6,851,108 | B1 | 2/2005 | Syme et al. |
| 6,981,249 | B1 | 12/2005 | Knoblock et al. |
| 7,055,132 | B2 * | 5/2006 | Bogdan et al. ............. 717/116 |
| 7,117,488 | B1 | 10/2006 | Franz et al. |
| 7,120,898 | B2 | 10/2006 | Grover et al. |
| 7,168,060 | B2 | 1/2007 | Matsumoto et al. |
| 7,346,901 | B2 * | 3/2008 | Syme et al. ................ 717/148 |
| 7,370,321 | B2 | 5/2008 | Radigan |
| 7,380,242 | B2 | 5/2008 | Alaluf et al. |
| 2002/0026633 | A1 | 2/2002 | Koizumi et al. |
| 2002/0059568 | A1 | 5/2002 | Kawahito et al. |
| 2002/0083425 | A1 | 6/2002 | Gillies et al. |
| 2002/0095667 | A1 | 7/2002 | Archambault |
| 2002/0166115 | A1 | 11/2002 | Sastry |
| 2002/0169999 | A1 | 11/2002 | Bhansali et al. |
| 2002/0170044 | A1 | 11/2002 | Tarditi |
| 2003/0018961 | A1 | 1/2003 | Ogasawara |
| 2003/0101335 | A1 | 5/2003 | Gillies et al. |
| 2003/0101380 | A1 | 5/2003 | Chaiken et al. |
| 2003/0101438 | A1 | 5/2003 | Mishra et al. |
| 2003/0131147 | A1 | 7/2003 | Wilt et al. |
| 2003/0145312 | A1 | 7/2003 | Bates et al. |
| 2003/0217196 | A1 | 11/2003 | Chan et al. |
| 2003/0217197 | A1 | 11/2003 | Chan et al. |
| 2003/0226133 | A1 | 12/2003 | Grover |
| 2004/0015897 | A1 | 1/2004 | Thompson et al. |
| 2004/0025152 | A1 | 2/2004 | Ishizaki et al. |
| 2004/0049769 | A1 | 3/2004 | Lueh et al. |
| 2004/0093604 | A1 | 5/2004 | Demsey et al. |
| 2004/0095387 | A1 | 5/2004 | Demsey et al. |
| 2004/0098710 | A1 | 5/2004 | Radigan |
| 2004/0098724 | A1 | 5/2004 | Demsey et al. |
| 2004/0098731 | A1 | 5/2004 | Demsey et al. |
| 2004/0172639 | A1 * | 9/2004 | Luo et al. ................... 719/328 |
| 2004/0268327 | A1 | 12/2004 | Burger |

FOREIGN PATENT DOCUMENTS

| | | |
|---|---|---|
| EP | 0 665 493 | 8/1995 |
| EP | 0 757 313 | 2/1997 |
| EP | 1 049 010 | 11/2000 |
| WO | WO 01/48607 | 7/2001 |

OTHER PUBLICATIONS

"An abstract intermediate representation in compilation systems", Guilan et al., Feb. 2003, pp. 12-18, <http://delivery.acm.org/10.1145/780000/772972/p12-guilan.pdf>.*

"Design and implementation of generics for the .NET Common language runtime", Kennedy et al., Jun. 2001, pp. 1-12, <http://delivery.acm.org/10.1145/380000/378797/p1-kennedy.pdf>.*

"Typing a multi-language intermediate code", Gordon et al., Jan. 2001, pp. 248-260, <http://delivery.acm.org/10.1145/370000/360228/p248-gordon.pdf>.*

Ramsey and Jones, "A single intermediate language that supports multiple implementations of exceptions," May 2000, ACM SIGPLAN Notices, PLDI 2000, vol. 35, Issue 5, ISBN:1-58113-199-2, pp. 285-298.

Choi et al., "Efficient and precise modeling of exceptions for the analysis of Java programs," Sep. 1999, ACM SIGSOFT Software Engineering Notes, PASTE '99, vol. 24, Issue 5, ISSN:0163-5948, pp. 21-31.

Hennessy "Program optimization and exception handling," Jan. 1981, Proceedings of the 8$^{th}$ ACM SIGPLAN-SIGACT symposium on Principles of programming languages, ISBN:0-89791-029-X, pp. 200-206.

Woo et al., "Alias analysis for exceptions in Java," Jan. 2002, Australian Computer Science Communications, ACSC2002, vol. 24, Issue 1, ISBN-ISSN:1445-1336, 0-909925-82-8, pp. 321-329.

Robillard et al., "Analyzing exception flow in Java programs," Oct. 1999, ACM SIGSOFT Software Engineering Notes, ESEC/FSE-7, vol. 24, Issue 6, ISBN:3-540-66538-2, pp. 322-337.

Gosling "Java intermediate bytecodes," Mar. 1995, ACM SIGPLAN Notices, IR '95, vol. 30, Issue 3, ISSN:0362-1340, pp. 111-118.

Burke et al., "The Jalapeño dynamic optimizing compiler for Java," Jun. 1999, Proceedings of the ACM 1999 conference on Java Grande, ISBN:1-58113-161-5, pp. 129-141.

Litwak, "PURE Java™2," Dec. 1999, Sams Publishing, ISBN:0-672-31654-4, Chapter 10.

Kienle, "A SUIF Java Compiler," Aug. 1998, University of California Santa Barbara, Technical Report TRCS98-18, Section 5.9, 6.9, 8.3, and 9.2.15.

"C/C++ Language Reference: try-except Statement," May 11, 2000, Microsoft Corp., accessed Jul. 10, 2005 at <http://msdn.microsoft.com/library/default.asp?url=/library/en-us/vccelng/htm/key_s-z_4.asp>, 2 pages.

International Search Report, Sep. 1, 2005, PCT/US04/15965, 13 pages.

Hamilton, "Technical correspondence: language integration in the common language runtime," ACM Press, Feb. 2003, ACM SIGPLAN Notices, vol. 38, Issue 2, pp. 19-28.

"Common Language Infrastructure (CLI), Partition 1: Concepts and Architecture," ECMA TC39/TG3, Section 11.6, pp. 1-103, Oct. 2002.

"The LEX & YACC Page," http://dinosaur.compilertools.net/, 4 pages, website visited on Jun. 16, 2003.

"SMGN Reference Manual," http://suif.stanford.edu/suif/suif2/doc-2.20-4/, pp. 1-3, May 2003.

"Zephyr Abstract Syntax Description Language (ASDL): Zephyr ASDL," http://web.archive.org/web/19991103153820/http://www.cs.virginia.edu/zephyr/asdl.html, 1 page, Nov. 3, 1999.

"Zephyr Compiler Infrastructure: Zephyr: Tools for a National Compiler Infrastructure," http://web.archive.org/web/20000817014546/http://www.cs.virginia.edu/zephyr/, 1 page, Aug. 17, 2000.

"Zephyr Computer Systems Description Languages (CSDL): Generating Machine-Dependent Compiler Parts Using CSDL," http://web.archive.org/web/20000829045324/www.cs.virginia.edu/zephyr/csd1/, 1 page, Aug. 29, 2000.

"Zephyr Register Transfer Lists (RTLs): Compiling with Register Transfer Lists (RTLs)," http://web.archive.org/web/20000829045407/http://www.cs.virginia.edu/zephyr/rtl.html, 2 pages, Aug. 29, 2000.

"Zephyr Very Portable Optimizer (vpo): Machine-Independent Optimization," http://web.archive.org/web/20010424131242/http://www.cs.virginia.edu/zephyr/vpo/, 1 page, Apr. 24, 2001.

Adl-Tabatabai et al., "Code Reuse in an Optimizing Compiler," ACM SIGPLAN Notices, Proceedings of the Eleventh Annual Conference on Object-Oriented Programming Systems, Languages, and Applications, vol. 31, Issue 10, pp. 51-68, Oct. 1996.

Aigner et al., "An Overview of the SUIF2 Compiler Infrastructure," Technical Report, Computer Systems Laboratory, Stanford University and Portland Group, Inc., pp. 1-14, 2000.

Aigner et al., "SUIF Compiler System: The SUIF Program Representation," Computer Systems Laboratory, Stanford University and The Portland Group, Inc., http://suif.stanford.edu/suif/suif2/doc-2.2.0-4/suifguide/, pp. 1-30, Aug. 14, 2000.

Appel et al., "The Zephyr Compiler Infrastructure," Internal Report, http://www.cs.virginia.edu/zephyr, Princeton University and University of Virginia, pp. 1-10, Nov. 6, 1998.

Ayers et al., "Scalable Cross-Module Optimization," ACM SIGPLAN Notices, Proceedings of the ACM SIGPLAN 1998 Conference on Programming Language Design and Implementation, vol. 33, Issue 5, pp. 301-312, May 1998.

Benitez et al., "Target-Specific Global Code Improvement: Principles and Applications," Technical Report CS-94-92, Department of Computer Science, University of Virginia, pp. 1-14, 1994.

Blickstein et al., "The GEM Optimizing Compiler System," Digital Technical Journal, vol. 4, No. 4, Special Issue, pp. 1-17, 1992.

Brooks et al., "Design of An Optimizing, Dynamically Retargetable Compiler for Common Lisp," Proceedings of the 1986 ACM Conference on LISP and functional programming, pp. 67-85, Aug. 1986.

Devanbu, "Re-targetability in Software Tools," ACM SIGAPP Applied Computing Review, vol. 7, Issue 3, pp. 19-26, Sep. 1999.

Engler, "VCODE: A Retargetable, Extensible, Very Fast Dynamic Code Generation System," ACM SIGPLAN Notices, Proceedings of the ACM SIGPLAN 1996 Conference on Programming Language Design and Implementation, vol. 31, Issue 5, pp. 160-170, May 1996.

Ganapathi et al., "Retargetable Compiler Code Generation," ACM Computing Surveys (CSUR), vol. 14, Issue 4, pp. 573-592, Dec. 1982.

Goodenough, "Exception Handling: Issues and a Proposed Notation," Communications of the ACM, vol. 18, No. 12, pp. 683-696, Dec. 1975.

Guilan et al., "Retargetable Cross Compilation Techniques—Comparison and Analysis of GCC and Zephyr," *ACM SIGPLAN Notices*, Technical Correspondence, vol. 37, Issue 6, pp. 38-44, Jun. 2002.

Hayes et al., "Component Design of Retargetable Program Analysis Tools that Reuse Intermediate Representations," Proceedings of the 22nd International Conference on Software Engineering, Limerick, Ireland, ACM, pp. 356-365, Jun. 2000.

Heine et al., "Interprocedural Program Analyses," ACM SIGPLAN 2000 Conference on Programming Language Design and Implementation, Vancouver, B.C., 22 pages, http://suif.stanford.edu/suif/suif2/doc-2.2.0-4/tutorial/analysis.ppt, Jun. 2000.

Heine, "An Overview of the SUIF2 Base Infrastructure," ACM SIGPLAN 2000 Conference on Programming Language Design and Implementation, Vancouver, B.C., 30 pages, http://suif.stanford.edu/suif/suif2/doc-2.2.0-4/tutorial/basesuif.ppt, Jun. 2000.

Holzle et al., "OSUIF: SUIF For Objects," ACM SIGPLAN 2000 Conference on Programming Language Design and Implementation, Vancouver, B.C., pp. 1-17, http://suif.stanford.edu/suif/suif2/doc-2.2.0-4/tutorial/osuif-intro.ps, Jun. 2000.

Kessler et al., "EPIC—A Retargetable, Highly Optimizing Lisp Compiler," ACM SIGPLAN Notices, Proceedings of the 1986 SIGPLAN Symposium on Compiler Construction, vol. 21, Issue 7, pp. 118-130, Jul. 1986.

Khedker et al., "Bidirectional Data Flow Analysis: Myths and Reality," ACM SIGPLAN Notices, vol. 34, No. 6, pp. 47-57, Jun. 1999.

Kienle, "OSUIF: A Closer Look," ACM SIGPLAN 2000 Conference on Programming Language Design and Implementation, Vancouver, B.C., pp. 1-31, http://suif.stanford.edu/suif/suif2/doc-2.20-4/ tutorial/osuif-details.ps, Jun. 2000.

Knoop et al., "Lazy Code Motion," In Proceedings of the ACM SIGPLAN '92 Conference on Programming Language Design and Implementation, San Francisco, CA, 11 pages, Jun. 1992.

Knoop et al., "Partial Dead Code Elimination," In Proceedings of the ACM SIGPLAN '94 Conference on Programming Language Design and Implementation, 12 pages, Jun. 1994.

Lam, "An Overview of the SUIF2 System,"ACM SIGPLAN '99 Conference on Programming Language Design and Implementation, Atlanta GA, 20 pages, http:suif.stanford.edu/suif/suif2/doc-2.2.0-4/tutorial/suif-intro.ppt, May 4, 1999.

Lim, "Affine Partitioning for Parallelism & Locality," ACM SIGPLAN 2000 Conference on Programming Language Design and Implementation, Vancouver, B.C., 16 pages, http://suif.stanford.edu/suif/suif2/doc-2.2.0-4/ tutorial/affine.ppt, Jun. 2000.

Morel et al., "Global Optimization by Suppression of Partial Redundancies," Communications of the ACM, vol. 22, No. 2, pp. 96-103, Feb. 1979.

Ramsey et al., "Machine Descriptions to Build Tools for Embedded Systems," Proceedings of the ACM SIGPLAN Workshop on Languages, Compilers, and Tools for Embedded Systems, 17 pages, 1998.

Smith, "Machine SUIF," ACM SIGPLAN 2000 Conference on Programming Language Design and Implementation, Vancouver, B.C., 15 pages, Jun. 2000.

Stallman, "Using and Porting the GNU Compiler Collection," 504 pages, http://www.skyfree.org/linux/references/gcc-v3.pdf, Jul. 28, 1999.

Wegbreit, "Property Extraction in Well-Founded Property Sets," IEEE Transactions on Software Engineering, vol. 1, No. 3, pp. 270-285, Sep. 1975.

"Attribute-Based Templates for Microsoft .NET", 2001, newtelligence AG, 7 pages.

Tarditi et al.; "No Assembly Required: Compiling Standard ML to C"; Kluwer Academic Publishers, 1990; pp. 1-16.

Okasaki et al.; "Call-by-Need and Continuation-passing Style"; Lisp and Symbolic Computation: An International Journal; Kluwer Academic Publishers, 1993; pp. 1-25.

Johnson et al.; "Dependence-Based Program Analysis"; ACM SIGPLAN'93 PLDI, Jun. 1993; pp. 1-12.

Ayguade et al.; "A Uniform Internal Representation for High-Level and Instruction-Level Transformations"; 1994; pp. 1-25.

Weaver et al.; "Score: A Compiler Representation for Heterogeneous Systems"; Dec. 1995; pp. 1-14.

Saito et al.; "PROMIS IR Design"; Sep. 29, 1997; pp. 1-4.

Saito et al.; "PROMIS IR Implementation—AST Components—"; Sep. 29, 1997; pp. 1-4.

Polychronopoulos et al.; "The Promis Compiler Project—Annual Report"; Oct. 1, 1997; pp. 1-15.

Cho et al.; "High-Level Information—An Approach for Integrating Front-End and Back-End Compiler"; Aug. 1998; pp cover page and 1-19.

Larus; "Whole Program Paths"; Proceedings of the SIGNPLAN'99 Conference on Programming Language Design and Implementation (PLDI 99), May 1999; pp. 1-11.

Fitzgerald et al.; "Marmot: An Optimizing Compiler for Java"; Technical Report MSR-TR-99-33; Jun. 16, 1999; pp cover page and 1-29.

Fitzgerald et al.; "The Case Profile-Directed Selection of Garbage Collectors"; 2000; pp. 1-10.

"1.3 Compiler Architecture" http://lambda.uta.edu/cse5317/notes/node5.html visited on May 20, 2003; pp. 1-2.

"Implementation of a Parallelizing Compiler with a Universal Intermediate Representations: Translating of Source Codes into Universal Intermediate Representations" http://www.ipsj.or.jp/members/SIGNotes/Eng/22/1997/017/article004.html visited on May 20, 2003; pp. 1-2.

"Scale Download"; Dept. of Computer Science, University of Massachusetts Amherst; http://www-ali.cs.umass.edu/Scale/download.html visited on May 20, 2003; pp. 1-13.

"Overview of the SA-C Compiler" http://www.cs.colostate.edu/Cameron/compiler.html visited on May 20, 2003; pp. 1-2.

"PROMIS Release Announcement" http://www.csrd.uiuc.edu/promis/release_announcement.html visited on May 20, 2003; pp. 1-3.

"Scale"; Dept. of Computer Science, University of Massachusetts Amherst; http://www-ali.cs.umass.edu/Scale/ visited on May 20, 2003; pp. 1-46.

"CIL: Infrastructure for C Program Analysis and Transformation"; May 30, 2003; pp. 1-54.

"PROMIS Implementation—The Illinois-Irvine PROMIS Team" http://www.csrd.uiuc.edu/promis/ visited on Jun. 4, 2003; pp. 1-32.

"Illinois-Irvine PROMIS Compiler Internal Representation" http://www.csrd.uiuc.edu/promis/ visited on Jun. 4, 2003; pp. 1-17.

"Technical Overview" http://www.csrd.uiuc.edu/promis/overview.html visited on Jun. 4, 2003; pp. 1-2.

"A Parallelizing Compiler Framework" http://www.csrd.uiuc.edu/promis/home.html visited on Jun. 4, 2003; pp. 1-2.

"Demystifying .NET Compilation" http://www.zdnet.com.au/printfriendly?AT=2000035027-20264543, pp. 1-4, including 1 page of "Figure A", Apr. 12, 2002.

Harper et al., "Compiling Polymorphism Using Intensional Type Analysis", ACM Symposium on Principles of Programming Languages, pp. 130-141, Jan. 1995.

Tarditi et al., "TIL: A Type-Directed Optimizing Compiler for ML", 1996 SIGPLAN Conference on Programming Language Design and Implementation, pp. 181-192, May 1996.

Tarditi, "Design and Implementation of Code Optimizations for a Type-Directed Compiler for Standard ML", PhD Thesis, Carnegie Mellon University, 6 pages of introduction and pp. i-266, Dec. 1996 (Available as Technical Report CMU-CS-97-108).

Morrisett et al., "Stack-Based Typed Assembly Language", Xavier Leroy and Atsushi Ohori, editors, Lecture Notes in Computer Science, vol. 1473, pp. 28-52, Mar. 1998.

Colby et al., "A Certifying Compiler for Java", 2000 SIGPLAN Conference on Programming Language Design and Implementation, pp. 95-107, Vancouver, Canada, Jun. 2000.

Necula, "Compiling With Proofs", PhD thesis, Carnegie Mellon University, 27 pages, Sep. 1998.

Alpern et al., "Detecting Equality of Variables in Programs"Proceedings of the $15_{th}$ ACM SIGPLAN-SIGACT Symposium on Principles of Programming Languages, pp. 1-11, 1988.

Bacon, "Fast and Effective Optimization of Statically Typed, Object-Oriented Languages", PhD thesis, Computer Science Division, University of California, Berkeley, 3 pages of introduction and pp. i-141, 1997.

Bodik et al., "ABCD: Eliminating Array Bounds Checks on Demand", Proceedings of ACM SIGPLAN 2000 Conference on Programming Language Design and Implementation, pp. 321-333.

Cytron, "Efficiently Computing Static Single Assignment Form and the Control Dependence Graph", ACM Transactions on Programming Languages and Systems, pp. 451-490, 1991.

Dean et al., "Optimizations of Object-Oriented Programs Using Static Class Hierachy Analysis", European Conference on Object-Oriented Programming, pp. 77-101, 1995.

Gay et al., "Fast Escape Analysis and Stack Allocation for Object-Based Programs", Proceedings of the 2000 International Conference on Compiler Construction, 12 pages, 2000.

Gupta, "Optimizing Array Bound Checks Using Flow Analysis", ACM Letters on Programming Languages and Systems, pp. 135-150, 1993.

Lengauer et al, "A Fast Algorithm for Finding Dominators in a Flowgraph", ACM Transactions on Programming Languages and Systems, pp. 121-141, 1979.

Mueller et al., "Avoiding Unconditional Jumps by Code Replications", Proceedings of the SIGPLAN '92 Conference on Programming Language Design and iMplementation, pp. 322-330, Jun. 1992.

RUF, "Effective Synchronization Removal for Java", ACM SIGPLAN Conference on Programming Language Design and Implementation, pp. 208-218, BC, Canada, 2000.

Tarjan, "Testing Flow Graph Reducibility", Proceedings of the Fifth Annual ACM Symposium on Theory of Computing, pp. 96-107, 1973.

Vitek et al., "Efficient Type Inclusion Tests", Proceedings of OOPSLA '97, pp. 142-157, Atlanta, Georgia, 1997.

Sun Microsystems, Inc., "The Java Language Environent: 6—Security in Java, 6.3 The Byte Code Verification Process" http://web.archive.org/web/19990302092957/http://java.sun.com/docs/white/langenv/Security.doc3.html, 3 pages (Mar. 2, 1999).

Yellin, "Low Level Security in Java" http://web.archive.org/web/19990117003400/http://java.sun.com/sfaq/verifier.html 13 pages (Jan. 17, 1999).

ANDF Consortium, "ANDF Overview" http://web.archive.org/web/20021208181559/http://www.info.uni-karlsruhe.de/~andf/overview.htm, 2 pages (Dec. 8, 2002).

X/Open Company Ltd., "X/Open Preliminary Specification, Architecture Neutral Distribution Format (XANDF)" pp. 1-10 (X/Open Company Ltd. 1996).

Cedilla Systems Inc., Products http://web.archive.org/web/20010728193511/www.cedillasystems.com/pages/about/products.html, 2 pages (Jul. 28, 2001).

Lee, A Certifying Compiler for Java http://www.-2.cs.cmu.edu/~petel/pcc/pcc-slides/SDIPOP.pdf, 10 pages (Sep. 2000).

Aho et al., "Compilers: Principles, Techniques and Tools", Copyright © 1986 by Bell Telephone Laboratories, Inc., cover and pp. ii, vii-x, 12-14, 463-512, and 585-722.

Appel, "Modern Compiler Implementation in ML", Copyright © Andrew W. Appel, 1998, Cambridge University Press, cover and pp. iv-viii, 148-210, 344-376, and 427-467.

Fraser et al., "A Retargetable C Compiler: Design and Implementation", Copyright © 1995 by At&T and David R. Hanson, cover and pp. iv, vii-xii, 311-372.

Hartoog et al., "Generation of Software Tools from Processor Descriptions for Hardware/Software Codesign," 1997 ACM.

Tanenbaum et al., "A practical tool kit for making portable compilers," Communications of the Association for Computing Machinery, ACM, New York, NY, vol. 26(9):654-660, Sep. 1983.

Keller et al., "Binary Component Adaptation," European Conference on Object Oriented Programming (ECOOP), 12th European Conference Proceedings, Springer-Verlag Berlin, Germany, pp. 307-329, 1998.

Baum et al., "Generic components to foster reuse," Proceedings 37th International Conference on Technology of Object-Oriented Languages and Systems, Tools-Pacific 2000 IEEE Comput. Soc. Los Alamitos, CA, pp. 266-277, 2000.

Kiczales et al., "Aspect-oriented programming," ECOOP, 1241:220-242, Jun. 1997.

Chiba et al., "Josh: An Open AspectJ-like Language," Proceedings of the International Conference on Aspect-Oriented Software Development (AOSD), Lancaster, UK, pp. 102-111, Apr. 22, 2002.

Arnold et al., "Exploring the Interaction between Java's Implicitly Thrown Exceptions and Instruction Scheduling", International Journal of Parallel Programming, vol. 29, Issue 2, Apr. 2001, pp. 111-137.

European Examination Report, European Patent Application No. 04 014 358.8, 11 pages, dated Jun. 13, 2008.

Gupta et al., "Optimizing Java Programs in the Presence of Exceptions", 2000, Lecture Notes in Computer Science; vol. 1850, ISBN:3-540-67660-0, pp. 422-446.

Grimes, Richard Dr., "Professional DCOM Programming," Canada, Wrox Press Ltd., Chapter 3, 72 pages (Jun. 1997).

Lidin, Serge, "Inside Microsoft .NET IL Assembler," Redmond, Washington, Microsoft Press, Chapters 5-9 and Chapters 15-16, 214 pages (Feb. 2002).

Porter III, "Smalltalk: A White Paper Overview," <http://web.cecs.pdx.edu/~ harry/musings/SmalltalkOverview.pdf>, Portland State University, 77 pages (Mar. 2003).

Tanenbaum et al., "A practical tool kit for making portable compilers," Communications of the Association for Computing Machinery, ACM, New York, NY, 26(9):654-660, 12 pages, Sep. 1983.

Taft, "Programming the Internet in Ada 95," Ada-Europe, p. 1-19, <http://citeseer.ist.psu.edu/taft96programming.html> (1996).

\* cited by examiner

FIG. 2

Source:  z = a + b + c;  - 200

HIR:
t1 = ADD    a, b   - 202
t2 = ADD    t1, c  - 204
z = ASSIGN  t2     - 206

LIR:
t1(EAX), cc = x86add a(EAX), b(EDX)   - 208
t2(EAX), cc = x86add t1(EAX), c(EBX)  - 210
z = x86mov t2(eax)                    - 212

REPRESENTING TYPE INFORMATION IN A COMPILER AND PROGRAMMING TOOLS FRAMEWORK

CROSS REFERENCE TO RELATED APPLICATIONS

This application is a continuation-in-part application claiming priority from application Ser. No. 10/607,591, filed Jun. 27, 2003, with inventorship listed as Mark Ronald Plesko and David Read Tarditi, Jr., entitled, "TYPE SYSTEM FOR REPRESENTING AND CHECKING CONSISTENCY OF HETEROGENEOUS PROGRAM COMPONENTS DURING THE PROCESS OF COMPILATION," which is hereby incorporated herein by reference.

TECHNICAL FIELD

The technical field relates to type systems, such as a type system for representing type information in a compiler or other software development tool.

BACKGROUND

A type system can be used in programming languages to aid in the detection and prevention of programming or run-time errors. A "typed" programming language can contain a set of types that are declared for software items such as variables, functions, etc. These types can be checked versus a set of rules during compilation of a program written in the language. If the source code written in the typed language violates one of the type rules, a compiler error is determined.

Typed intermediate languages for use in compilers have received significant study in the research community over the past few years. They enhance the reliability and robustness of compilers, as well as provide a systematic way to track and check information needed by garbage collectors. The idea is to have an intermediate representation that has types attached to it and that can be type-checked in a manner analogous to type-checking for source programs. However, a typed intermediate language is more difficult to implement because types that represent items made explicit during the compilation process are necessary.

A typed intermediate language is even more difficult to implement if it must represent a number of different high-level programming languages. The different languages not only have different primitive operations and types, but the high-level programming languages have different levels of typing. For instance, some languages, such as assembly languages, are generally untyped. In other words, they have no type system. Of the languages that are typed, some are strongly typed while others are more loosely typed. For instance, C++ is generally considered a loosely typed language, whereas ML or Pascal are considered strongly typed languages. Further, some languages that are loosely typed have smaller sub-sets of the language that allow for a majority of the code sections within a program to be strongly typed, while other code sections are loosely typed. For example, C# and Microsoft Intermediate Language used in .NET (MSIL) allow this. Therefore, a typed intermediate language used to represent any of these high-level languages must be able to represent different types strengths. Likewise, the type system of such a typed intermediate language must be able to implement different rules depending on characteristics of the code being type checked.

Another problem arises when a typed intermediate language is lowered throughout the process of compilation. The lowering of a language refers to the process of changing the form of a language from a higher level form, such as what a programmer would write, to a lower level, such as to an intermediate language. The language can then be further lowered from the intermediate language to levels closer to what a computer executes, such as machine-dependent native code. In order to type-check an intermediate language that is lowered to different levels during the compilation process, a different set of rules must be used for each representation.

Attempts to create typed intermediate languages often fall short of solving the problems discussed above. For instance, Cedilla Systems' Special J compiler uses a typed intermediate language. However, this compiler is specific to the Java source language and therefore did not need to process multiple languages that may, for instance, have non-type-safe code. Additionally, this compiler only uses one set of rules for type-checking and therefore could not be used for multiple levels of compilation. In the research community, typed intermediate languages often tend to be highly specific to the source language and difficult to engineer (and design the types) for the multiple stages of compilation.

SUMMARY

A representation of types, a type-checker, a method and a compiler are provided for checking consistency in various forms of an intermediate language. Specifically, the typed intermediate language is suitable for use in representing programs written in multiple (heterogeneous) source languages including typed and untyped languages, loosely and strongly typed languages, and languages with and without garbage collection. Additionally, the type checker architecture is extensible to handle new languages with different types and primitive operations. The representation of types, type-checker, method and compiler include various aspects. The various aspects may be used separately and independently, or the various aspects may be used in various combinations and sub-combinations.

In one aspect, a method is provided for representing type information via objects of classes in a class hierarchy. Sub-classes in the hierarchy can represent classifications of types. Objects instantiated for the sub-classes can store type information for software items (e.g., pointers, variables or other containers, functions and the like).

In another aspect, a computer-readable medium having a software program thereon containing program code for defining a programming class for primitive types (e.g., 'PrimType'). Instances of the class can have a size and kind of type associated with them. The class can represent a number of primitive types of a plurality of programming languages.

In yet another aspect, a method of programmatically defining a representation of types is provided wherein a base class is defined as the top of a hierarchy and a plurality of classes hierarchically below the base class are also defined that represent a number of types from numerous programming languages, such as pointer types, container types and function types.

These and other aspects will become apparent from the following detailed description, which makes reference to the accompanying drawings.

BRIEF DESCRIPTION OF THE DRAWINGS

FIG. 2 is a table listing showing a conversion of a source code statement into an high-level representation, and then to a machine-dependent low-level representation.

DETAILED DESCRIPTION

A representation of types, type-checker, and compiler are provided for checking consistency in various forms of an intermediate language. The type-checker and compiler allow use of different types and type-checking rules, depending on the source language for a program component and/or the stage of compilation. For example, it may be desirable to have a high-level optimizer apply to programs written in a variety of languages. These languages may have different primitive types and primitive operations. One language may contain types and operations for complex arithmetic, for example, whereas another language may contain types and operations specific to computer graphics. By allowing the intermediate representation to be parameterized by different type systems, the optimizer can be used for languages with different primitive types and operations. Another example can include a program where certain components are written in a strongly-typed subset of a language and other components are written in the full language, which is not type-safe. It is desirable to have more error checking for the first set of components. This can be accomplished by using different type-checking rules for the different components. Yet another example is dropping type information during compilation. The type-checker and compiler can allow type information to be dropped at later stages, while forcing precise information to be maintained during earlier stages. This can be accomplished by using an unknown type in combination with different type-checking rules for different stages of compilation.

Figure 1:
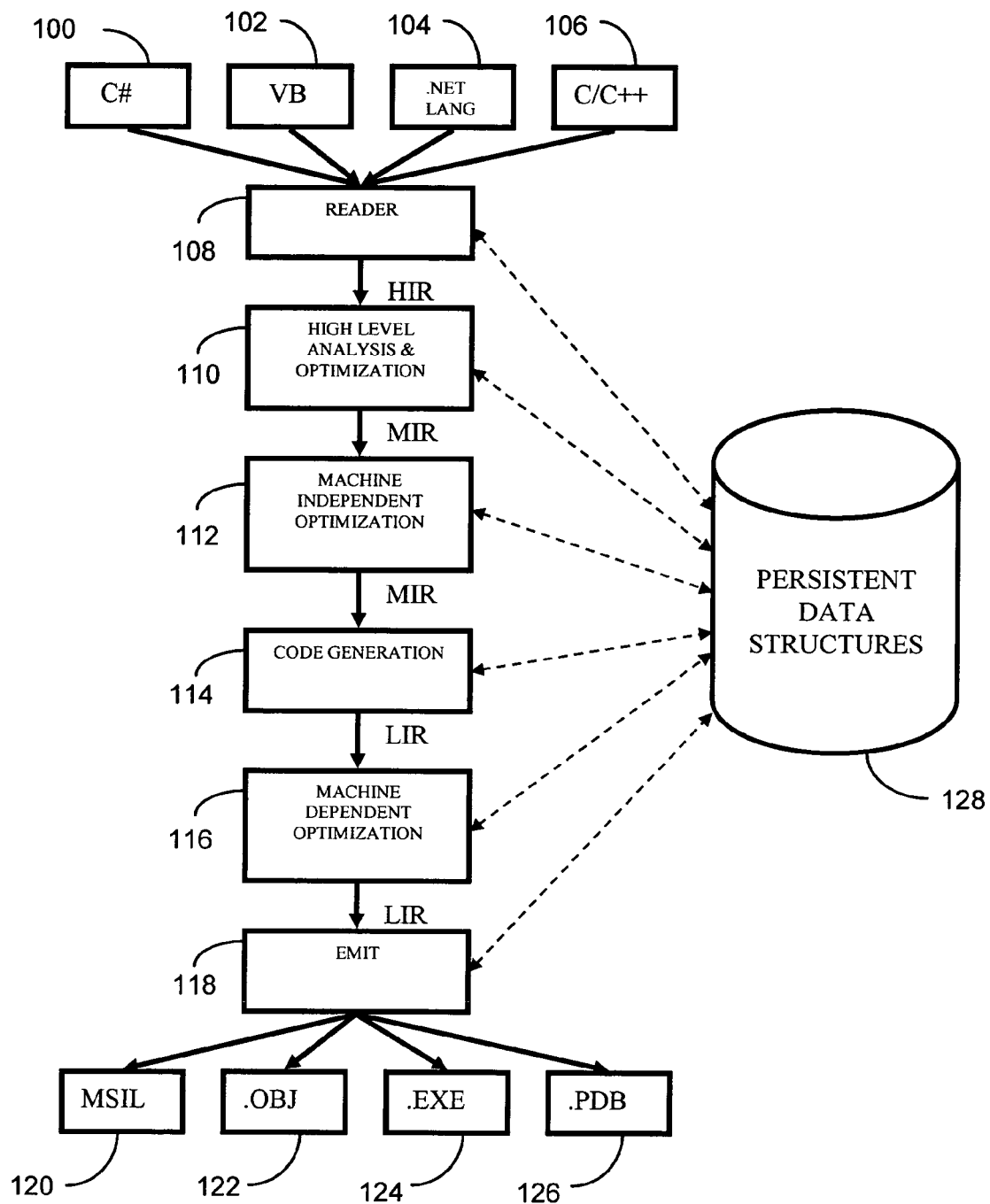
FIG. 1 is a flow diagram of a generic compilation process.

FIG. 1 shows a generic compilation process for a system utilizing a typed intermediate language with different levels of lowering for representing a number of different source languages. Source code 100-106 is written in four different source languages that may or may not be typed and have differing levels of type strength. For instance, source code 100 written in C# will be typed much stronger than source code 106 written in C++ for instance. Source code is first processed and entered into the system by a reader 108. The source language is then translated into a high-level intermediate representation of the typed intermediate language (HIR). The HIR can then optionally be analyzed and optimized at block 110. The HIR is then translated into a mid-level intermediate representation of the typed intermediate language (MIR). This representation is lower than the HIR but still machine independent. At this point, the MIR can optionally be analyzed and optimized as shown at block 112. The MIR is then translated into a machine-dependent low-level representation of the typed intermediate language (LIR) by code generation at block 114. LIR can then optionally be analyzed and optimized at block 116, and supplied to an emitter at block 118. The emitter will output code in one of many formats 120-126 representing the original source code read into the system. Throughout this process, the data necessary to complete the process is stored in some form of persistent memory 128.

Thus, the compilation process consists of transforming the intermediate language instructions from one level of representation to another. For instance, FIG. 2 shows the conversion of a source code statement into an HIR, as well as the conversion of the HIR to a machine-dependent LIR. Source code statement 200 can be written in a number of high-level programming languages. These languages are designed to allow programmers to write and read code in a manner that is easily understood. Thus, the programmer is allowed to use characters like '+' for addition, and allowed use of more powerful forms, such as adding more than two operands as shown in statement 200.

Statements 202-206 are an HIR representation of statement 200 that represents the same functionality, but does so in a format closer to that as would be understood by a computer and yet still architecture independent. Statement 202 uses an 'ADD' command to add a first and second variable and assigns the result to a first temporary variable t1. Statement 204 then uses another 'ADD' command to add t1 to the third variable and assigns the result to a second temporary variable t2. Statement 206 then assigns the value of t2 to the result variable z using an 'ASSIGN' instruction.

Statements 208-212 are a LIR of the intermediate language of the statements 202-206. Statement 208 uses an add instruction specific to the x86 architecture to add the values of two variables stored at specified registers and stores the result in a register assigned to a temporary variable t1. Statement 210 uses the add instruction specific to the x86 architecture to add the values of t1 and a third variable stored at the specified registers and stores the result in the specified register (EAX) assigned to t2. Statement 212 then uses a move instruction specific to the x86 architecture to move the value stored in EAX to the output variable z.

In order to implement type-checking, the typed intermediate language contains type representations expressed either explicitly or implicitly. An explicit type expression is declared directly in the representation. For example, the statement:

int a;

expressly defines the variable 'a' as type int. A type representation can be expressed implicitly by defining a default type for certain statements of code. For instance, if the default return type for functions is int, then the statement:

f_start ( );

would declare a function f_start that takes no arguments and returns a value of type int.

One embodiment of type representations for a typed intermediate language suitable for use with multiple programming languages at multiple levels of representation is shown in Appendix A. It should be noted that this is only an example of numerous possible embodiments.

Referring to Appendix A, a number of type representations are defined in a type class hierarchy such that type systems of various languages can be represented by the typed intermediate language. An abstract base class is defined as 'Phx::Type' for all types. The base class can contain, for instance, size information in 'sizekind' for values of specific types. The size may be constant, symbolic or unknown (or variable). The base class can also contain 'typekind' in order to designate type classification. Additionally, an external type can be provided as an abstract type that wraps an externally defined type in order to provide back mapping from the typed intermediate language to the original source code.

Below the base class, a class defined as 'Phx::PtrType' can represent pointer types. Various kinds of pointers can be defined as well. For instance, a managed, garbage collected object pointer (points to the base of a garbage collected object), a managed, garbage collected pointer (points to a location within a garbage collected object), an unmanaged pointer (such as would be found in code written in C++, for instance), and a null pointer.

At the same level in the hierarchy, a class defined as 'Phx::ContainerType' can represent container types, such as types that contain internal members. The internal members can be fields, methods and other types. A class defined as 'Phx::FuncType' can represent function types, including any necessary calling conventions, lists of arguments and lists of return types. Also, a class defined as 'Phx::UnmgdArrayType' can represent unmanaged array types. Under 'Phx::ContainerType' in the hierarchy, four more classes can be defined. A class defined as 'Phx::ClassType' can represent class types, a class defined as 'Phx::StructType' can represent struct types, a class defined as 'Phx::InterfaceType' can represent interface types, and a class defined as 'Phx::EnumType' can represent enumerated types. Under 'Phx::ClassType' in the hierarchy, an additional class defined as 'Phx::MgdArrayType' can represent managed array types.

In the representations shown in Appendix A, a class 'primtype' is defined as a special instance of a struct type. 'primtype' can include various types such as signed int, float, unknown, void, condition code, unsigned int, xint (signed or unsigned int), etc. These representations can be used in both a HIR or LIR of the typed intermediate language.

Additionally, target specific primitive types can be included in the type representation. Some languages have complex arithmetic types that can be handled efficiently if the type system is made aware of them. Take for instance an 'MMX' instruction. Such an instruction is one of a set of extra instructions built into some versions of x86 processors for supporting single instruction/multiple data operations on multimedia and communications data types. The type system can be customized to recognize and use these instructions with minimal alteration of the type representations.

The embodiment of the type representation of types shown in Appendix A also includes an "unknown" type, which can represent any type and optionally has a size associated with it. The size is the size of the machine representation of the value. An unknown type allows a compiler to drop type information in a controlled manner by changing the type information from a specific type to an unknown type. It allows the compiler to generate code that depends on the size of the value being manipulated, even when the type is unknown. Other types may use unknown types, so the unknown type also allows the representation of partial type information (where some but not all information is known).

For instance, assume a pointer to an int type. At some stage of lowering, it may be desirable to drop the referent type information, int. The unknown type allows the compiler to replace the int type with the unknown type. The type-checker then need not check that the pointer of interest is pointing to a correct type. It essentially takes the chance the value pointed to will be handed in such a manner as to not adversely affect the program functionality at runtime.

Another example of using an unknown type is for defining a type for a function. If a function with an argument of type pointer to unknown is called, where the argument previously had the type pointer to int, the compiler must trust that a value of the right type is being passed. The result of dereferencing the pointer may or may not be known to be an int; however, it will be used as an int. A more complex example is the introduction of an intermediate temporary variable during the conversion from high-level to low-level intermediate representation of a virtual function call. Virtual tables (vtables) are widely used to implement virtual calls in object-oriented languages. The first step in making a virtual function call in the low-level intermediate representation is to fetch the first field of an object of memory. The first field contains a pointer to a vtable. The result of fetch is then assigned to a temporary variable. Constructing the type of the temporary variable (a type that represents a pointer to a vtable, where the vtable may have many fields), may be complex and burdensome to represent. Instead, the compiler may simply assign the intermediate temporary variable "pointer to unknown." Thus, the use of the unknown type simplifies latter stages of compilation where keeping detailed type information is unnecessary or may represent a significant burden to the compiler implementer.

Figure 3:
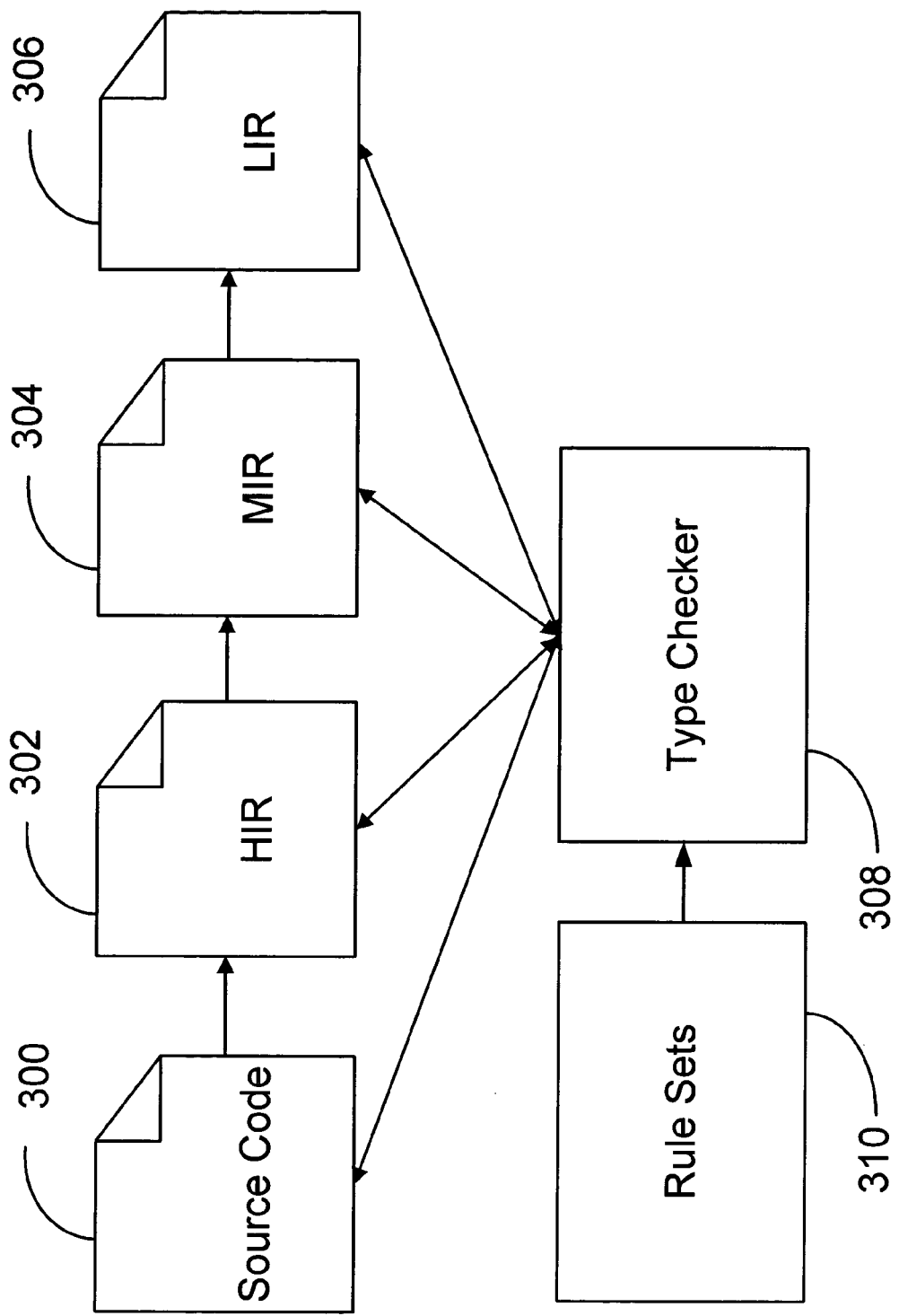
FIG. 3 is a data flow diagram illustrating one embodiment of a compiler system for type-checking a typed intermediate language at various stages of compilation.

FIG. 3 illustrates one embodiment of a compiler system for type-checking a typed intermediate language at various stages of compilation, and therefore, type-checking a typed intermediate language at various levels of lowering. Source code 300 represents any one of a variety of source languages. The source code 300 is translated into a HIR of the typed intermediate language 302. In doing so, the type representations of the source language are translated into the type representations internal to the typed intermediate language.

The HIR, as explained with respect to FIGS. 1 and 2, is lowered throughout the compilation process. For purposes of this illustration, a high (HIR) 302, mid (MIR) 304, and low (LIR) 306 level representations are shown. However, the embodiment is not so limited. Any number of stages of compilation may be type-checked.

The intermediate language at each level of representation may be type-checked by type-checker 308. The type-checker 308 implements an algorithm or procedure for applying one or more rule sets 310 to each stage of the compilation process, and therefore to each representation of the intermediate language. The rule sets 310 are a set of rules designed for varying properties of languages, such as the source language, stage of compilation, what strength of typing, etc.

For example, assume source code 300 contains code authored in the C++ programming language. The C++ source code 300 is first translated into an HIR 302 of the typed intermediate language. If desired, at this point the type-checker 308 can interact with the HIR 302 in order to determine any number of properties. Such properties might include the stage of compilation (HIR), the type of source code present (C++), whether or not the language is typed (yes), whether it is loosely or strongly typed (loosely), etc. Based on the properties, the type-checker can select an appropriate set of rules. Once a rule set is selected, the type-checker type-checks the HIR according to that set of rules. Once the HIR is lowered to MIR or LIR, the properties will be accessed again and the same or a different set of rules may be appropriate.

In one embodiment, three sets of type-checking rules can be supplied to the type-checker. One set can correspond to "strong" type-checking, such as would be desirable to type-check C# or MSIL. Another set can correspond to "weak" type-checking, which would be a looser type-checking than the "strong" type-checking. For instance, the weak type-checking rule set could permit type casts. A type cast is when a variable of one type is made to act like another for a single use. For instance, a variable of type int can be made to act like a char (character). The following code uses a type cast to print the letter 'P'.

int a;

a=80;

cout<<(char) a;

Thus, even though 'a' is defined as type int and assigned the value 80, the cout statement will treat the variable 'a' as type char due to the type cast and therefore display a 'P' (ASCII value 80) rather than 80.

Lastly, a set can correspond to "representation" checking. The "representation" checking can allow dropped type information in parts of the intermediate program representation, such as by using an unknown type, and can include rules that dictate when such type information can be dropped or when an unknown type can be substituted for another type. For instance, the result of a function that returns a value of type Void may be prohibited from being assigned to a variable of unknown type.

Additionally, more than one set of rules can be used at a single stage of compilation. For instance, assume the source code 300 contains a single language, but contains sections that are strongly typed and some sections that are loosely typed. The type-checker can use one set of rules for the HIR at certain strongly typed sections, and another set of rules for code sections that are loosely typed.

Figure 4:
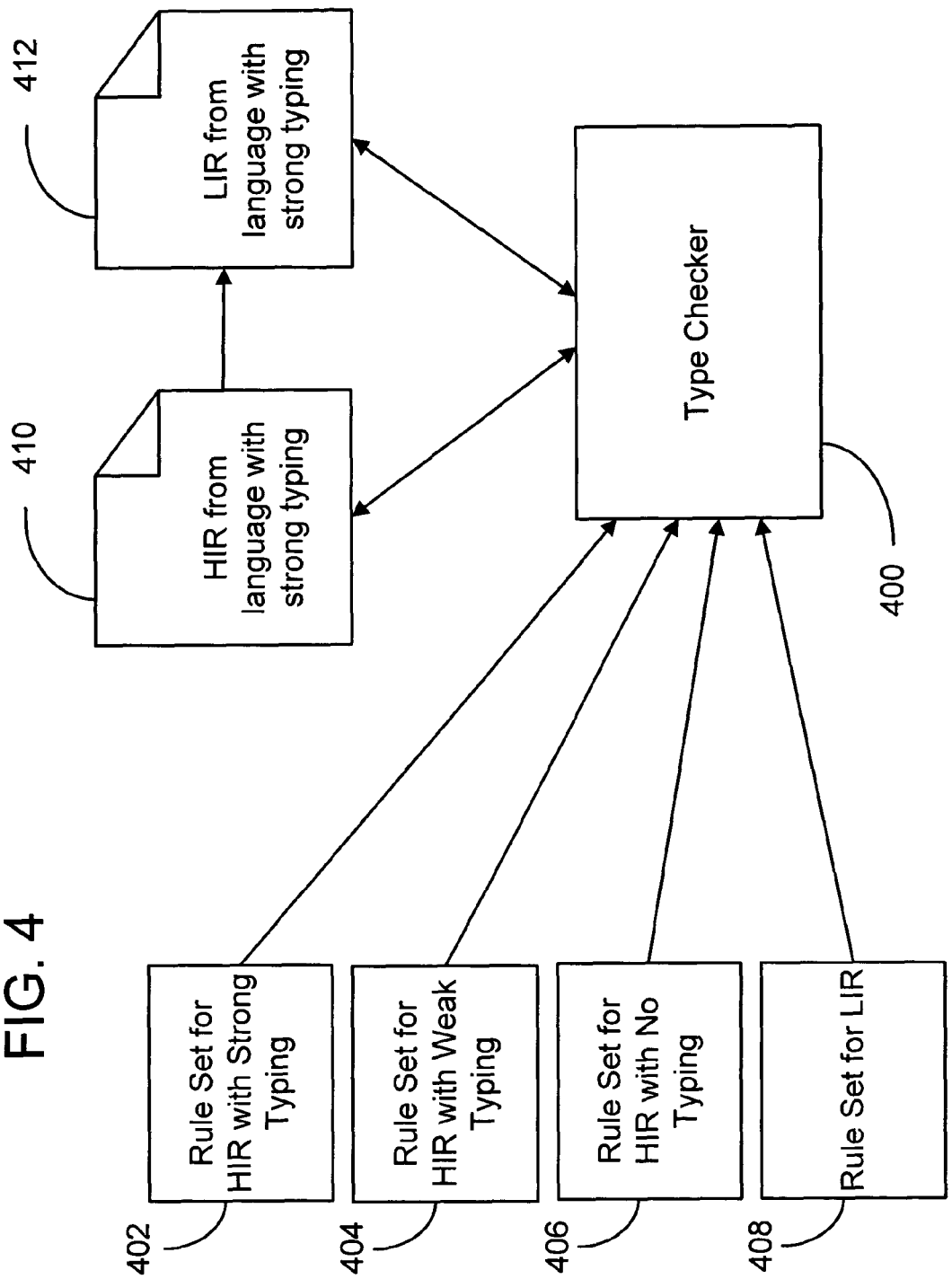
FIG. 4 is a block diagram of a type-checker for use in a compiler system.

FIG. 4 is a block diagram of a type-checker for use in a compiler system similar to that described in FIG. 3. Type-checker 400 can accept as input any number of rule sets corresponding to different source languages and/or different stages of compilation. In FIG. 4, four rules sets 402-408 are provided to type-checker 400. Rule set 402 represents a rule set for an HIR for languages with strong typing, rule set 404 represents a rule set for an HIR for languages with weak typing, rule set 406 represents a rule set for an HIR for languages with no typing, and rule set 408 represents a rule set for an LIR. Program module 410 represents a language with strong typing in a HIR, and program module 412 represents program module 410 after being lowered to an LIR.

The type-checker 400 selects an appropriate rule set based on properties of the program module being type-checked and applies the selected rule set to the program module using an incorporated procedure or algorithm. For instance, type-checker 400 may select rule set 402 (representing a rule set for an HIR for languages with strong typing) in order to type-check program module 410 (representing a language with strong typing in a HIR). Subsequently, the type-checker 400 may then select rule set 408 (representing a rule set for an LIR) in order to type-check program module 412 (representing a language with strong typing in a LIR).

Figure 5:
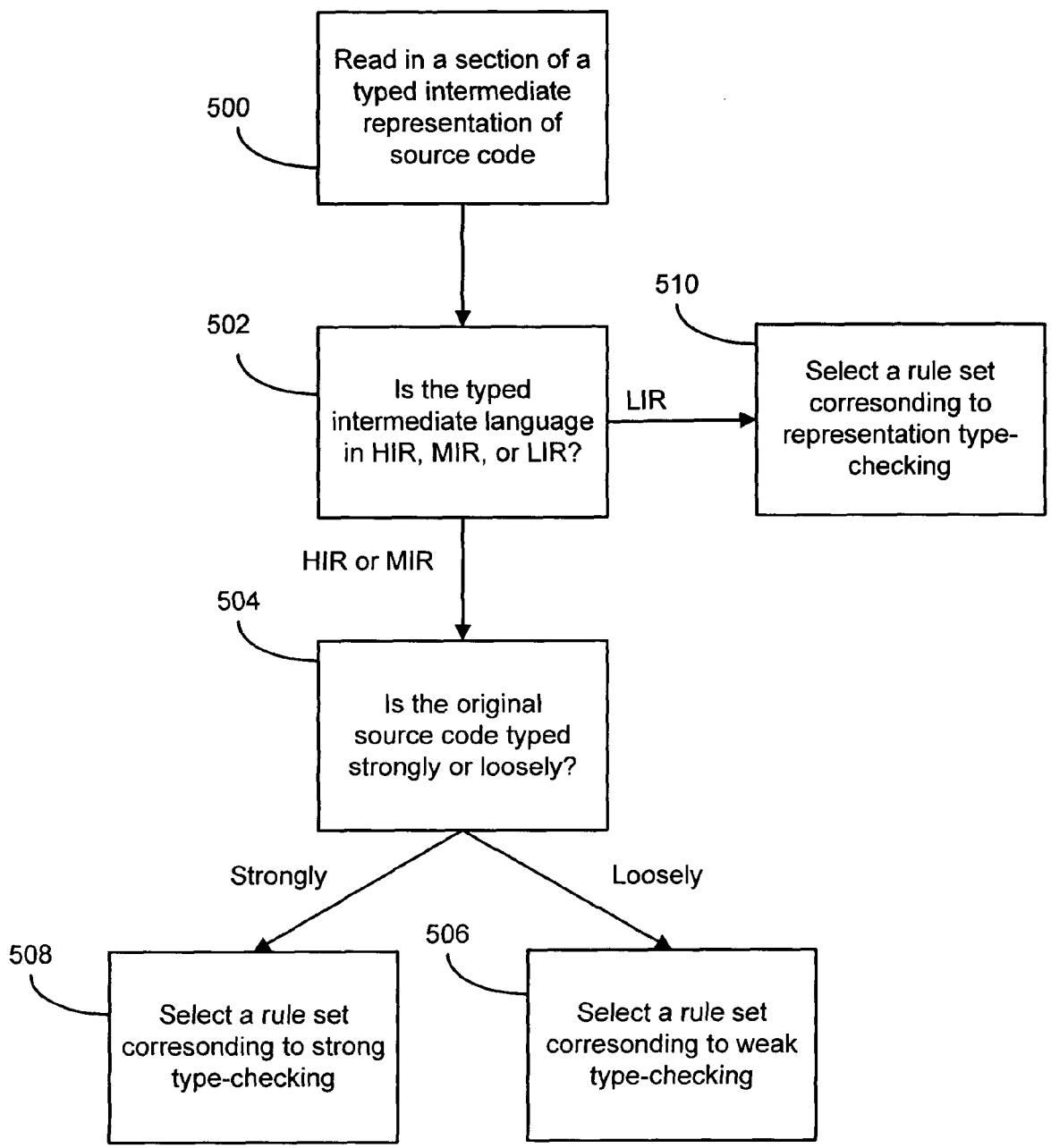
FIG. 5 is a flowchart for one possible procedure for choosing a rule set to be applied by a type-checker.

FIG. 5 is a flowchart for one possible embodiment of a procedure for choosing a rule set to be applied by the type-checker. At block 500, a type-checker reads in a section of a typed intermediate representation of source code and must select a rule set for type-checking. Decision 502 determines if the typed intermediate language is a HIR, MIR, or LIR.

If it is a HIR or MIR, decision 504 is processed to determine if the original source code was loosely or strongly typed. If it was loosely typed, block 506 is processed to select a rule set corresponding to weak type-checking. If it was strongly typed, block 508 is processed to select a rule set corresponding to strong type-checking.

If it is an LIR, decision block 510 is processed to select a rule set corresponding to representation type-checking. It should be noted that FIG. 5 is just one embodiment. Any number of rule sets can be selected, corresponding to and based on different properties.

The rule sets of the type-checking system described are easily extended to entirely new languages, and also to new features of existing languages. For instance, should a new language be introduced, a new rule set is simply authored for the new language. Since the rule sets are separate from the type-checker or compiler system itself and are designed to accept the rule sets as separate entities, new rule sets for new languages can be distributed without having to re-distribute or update existing type-checking systems or compilers. Likewise, if a new feature is added to an existing language, such as adding XML support to C++ for instance, the rule set corresponding to C++ at the various stages of compilation can be easily reconfigured dynamically to handle the new feature. Again, no new core system need be updated or distributed.

The rule sets can also allow for constraints on types. For instance, whether sub-typing is allowed for a particular type when a class inherits from another may be a constraint described in the rules. Another constraint may be a boxed constraint, such as might be desired to indicate data can be converted into a virtual table containing the data. Others may include a size constraint, or a primitive type constraint indicating the necessity for identical types of primitives. Like any other part of the rule set, new constraints can be added as desired.

The set of rules used by the type-checker can be constructed through a programming interface to an application for authoring the rule sets. The application can construct the rules such that the rule set is represented in a hierarchy of type primitives with rules assigned to individual instructions of the typed intermediate language. The hierarchy can be provided in the form of a type graph that will explicitly express various elements of types relevant to a particular program module or compilation unit. The IR elements such as symbols and operations will be associated with elements of the type systems. The type graph nodes will describe the primitive and constructed types and their relationships such as components, nested types, function signatures, interface types, elements of hierarchy and other information such as source names and references to module/assembly external type elements.

An example of a simple type rule is as follows:

ADD

N=add n, n

Figure 6:
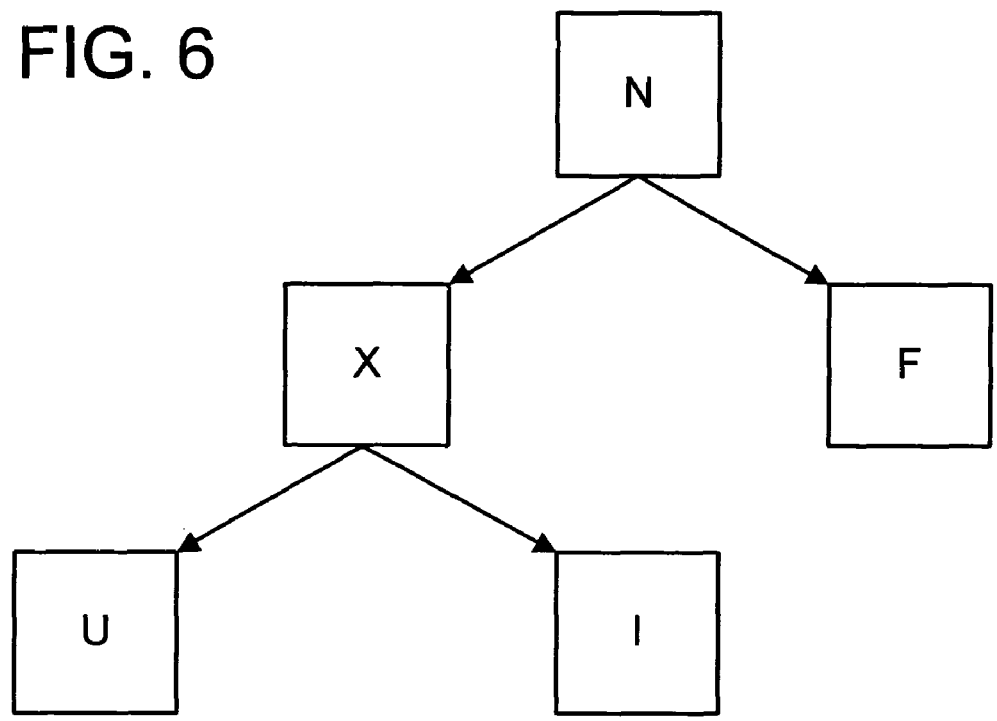
FIG. 6 is a directed graph diagram showing a hierarchical relationship between types.

Assume for purpose of this example that I is a signed integer type, U is an unsigned integer type, X is either type of integer, F is float, and N is any of the above. FIG. 6 shows the hierarchical relationship between these types. Type N is at the top of the hierarchy. The types F and X branch down from type N to form the subsequent level of the hierarchy. Lastly, types U and I branch down from the X type to form the lowest level of the hierarchy. Thus, for an 'ADD' intermediate language instruction, according to this rule only type N or lower in the hierarchy can be processed by the add instruction, and the operands must be no higher on the hierarchy than the result. For instance, two integers can be added to produce an integer (I=ADD i, i), or an integer and a float can be added to produce a float (F=ADD i, f). However, a float and an integer cannot be added to produce an integer (I=ADD i, f).

Figure 7:
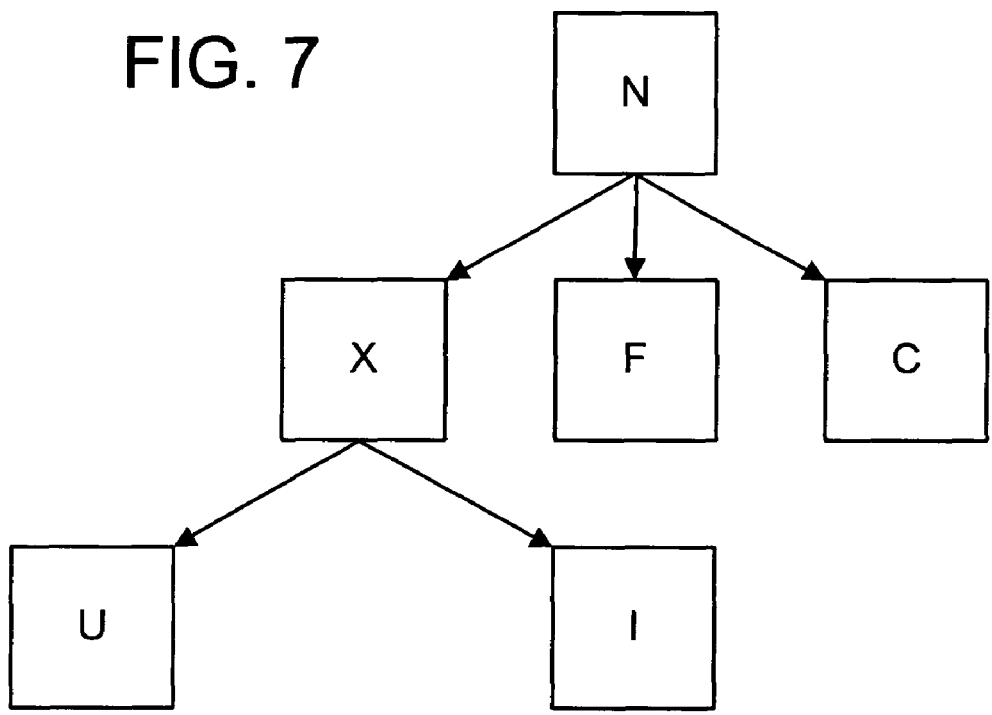
FIG. 7 is a directed graph diagram showing the addition of a type to a hierarchical relationship between types.

Representing the type primitives as hierarchies allows the rule sets to be altered easily. In the past, type rules have often been expressed programmatically using source code. For example, a type-checker may contain a large number of switch statements that implement the type-checker rules. Thus, changing a rule required modifying the source code for the type-checker. However, the hierarchical rule sets provide for much easier extensibility. Consider the previous rule for the ADD instruction. If a developer wanted to add a type, for instance C for a complex type, it can simply be added under the N type in the hierarchy as shown in FIG. 7 and the rule for the ADD instruction need not be altered to function as desired.

Figure 8:
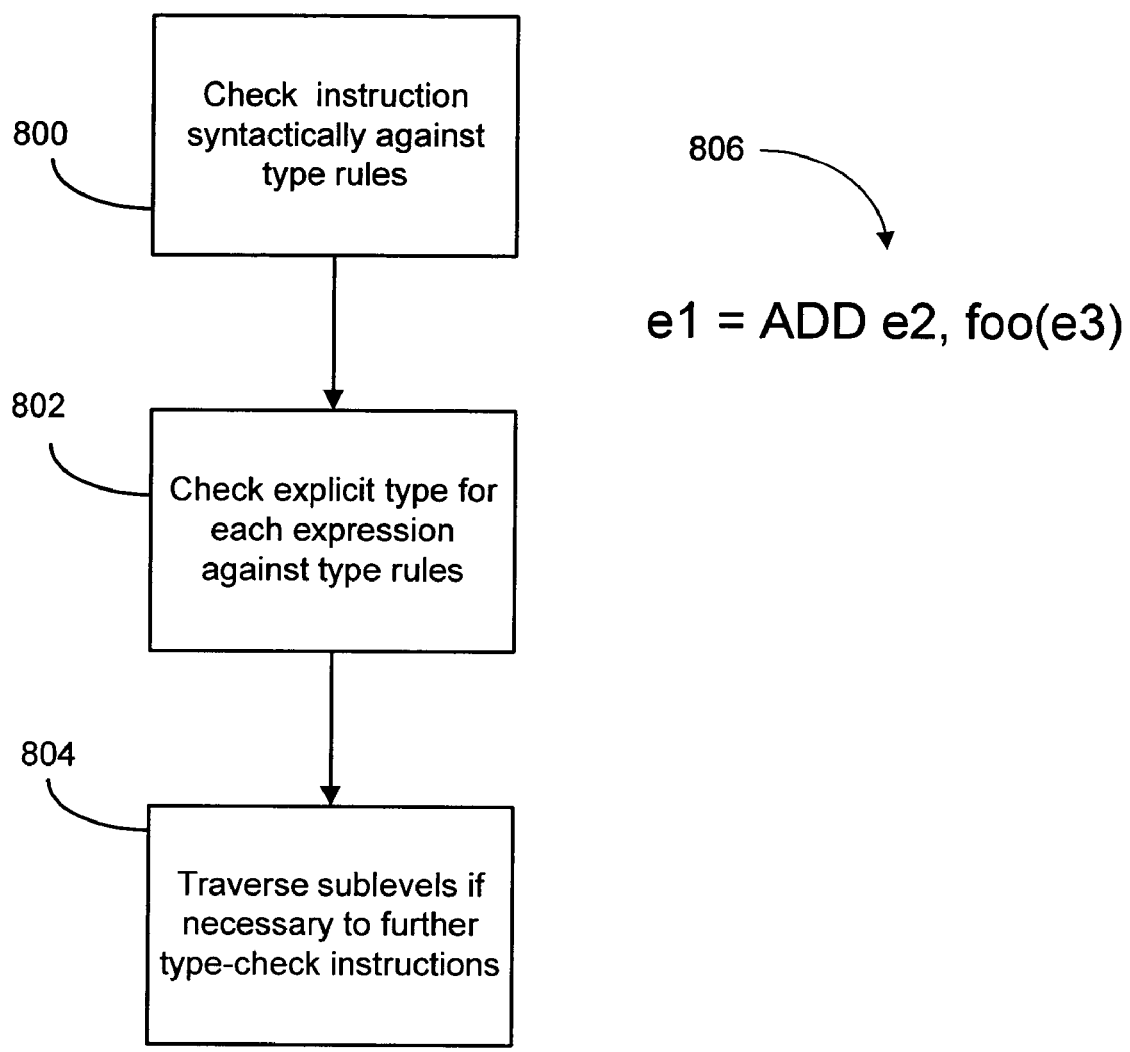
FIG. 8 is a flow chart of a method for checking an instruction against a type rule in a type-checking system.

One method for checking an instruction in a type checking system against a type rule is shown in FIG. 8. First, block 800 is processed to check the instruction syntactically. Thus, considering the instruction at 806, the type-checker will ensure that the correct number of source and destination expressions exist according to the type rule for the ADD instruction (for example, in this case there are 2 source expressions and one destination expression). Each expression (and subexpression) may have an explicit type on it in the intermediate representation. At block 802, the type-checker will then actually verify that the explicit types for e1, e2, and foo(e3) conform to the type rule for the ADD instruction. At block 804, the type-checker will traverse sub-levels if necessary to further type-check instructions. For instance, the type-checker can check that the expressions e1, e2, and foo(e3) are consistent with their explicit types. For instance, the type-checker may check that foo has a function type. It may check that the result type of the function type is the same as the explicit type on foo(e3). It may further check that there is a single argument type and that the type e3 matches that type. This ensures that the type of the call to e3 is consistent with type rules.

Figure 9:
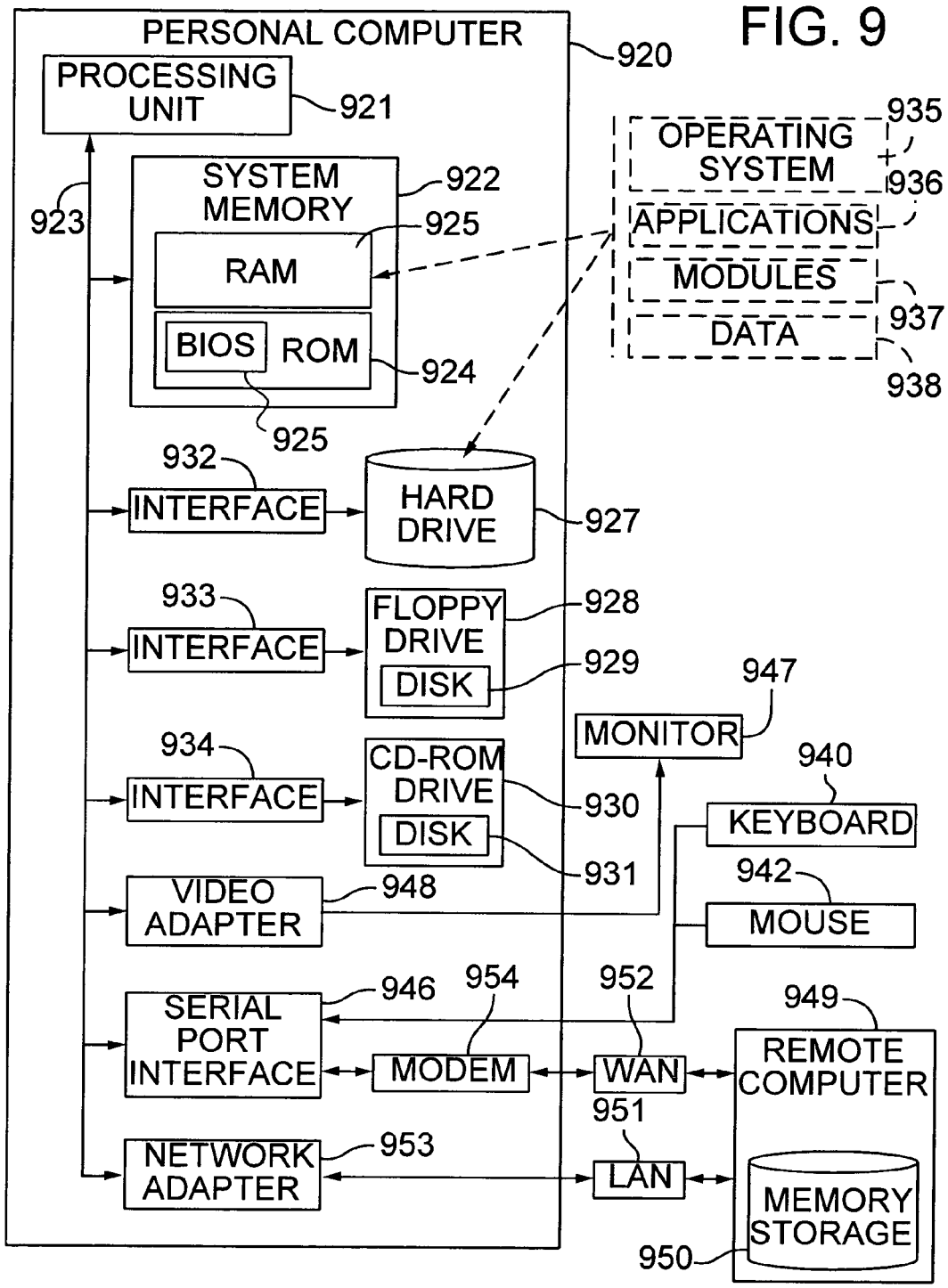
FIG. 9 is a block diagram of an example of a computer system that serves as an operating environment for an embodiment of a type-checking system.

FIG. 9 illustrates an example of a computer system that serves as an operating environment for an embodiment of a type-checking system. The computer system includes a personal computer 920, including a processing unit 921, a system memory 922, and a system bus 923 that interconnects various system components including the system memory to the processing unit 921. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 924 and random access memory (RAM) 925. A basic input/output system 926 (BIOS), containing the basic routines that help to transfer information between elements within the personal computer 920, such as during start-up, is stored in ROM 924. The personal computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions (program code such as dynamic link libraries, and executable files), etc. for the personal computer 920. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 925, including an operating system 935, one or more application programs 936, other program modules 937, and program data 938. A user may enter commands and information into the personal computer 920 through a keyboard 940 and pointing device, such as a mouse 942. Other input devices (not shown) may include a microphone, joystick, game pad, satellite dish, scanner, or the like. These and other input devices are often connected to the processing unit 921 through a serial port interface 949 that is coupled to the system bus, but may be connected by other interfaces, such as a parallel port, game port or a universal serial bus (USB). A monitor 947 or other type of display device is also connected to the system bus 923 via an interface, such as a display controller or video adapter 948. In addition to the monitor, personal computers typically include other peripheral output devices (not shown), such as speakers and printers.

The personal computer 920 may operate in a networked environment using logical connections to one or more remote computers, such as a remote computer 949. The remote computer 949 may be a server, a router, a peer device or other common network node, and typically includes many or all of the elements described relative to the personal computer 920, although only a memory storage device 950 has been illustrated in FIG. 9. The logical connections depicted in FIG. 9 include a local area network (LAN) 951 and a wide area network (WAN) 952. Such networking environments are commonplace in offices, enterprise-wide computer networks, intranets and the Internet.

When used in a LAN networking environment, the personal computer 920 is connected to the local network 951 through a network interface or adapter 953. When used in a WAN networking environment, the personal computer 920 typically includes a modem 954 or other means for establishing communications over the wide area network 952, such as the Internet. The modem 954, which may be internal or external, is connected to the system bus 923 via the serial port interface 946. In a networked environment, program modules depicted relative to the personal computer 920, or portions thereof, may be stored in the remote memory storage device. The network connections shown are merely examples and other means of establishing a communications link between the computers may be used.

Having illustrated and described the principles of the illustrated embodiments, it will be apparent to those skilled in the art that the embodiments can be modified in arrangement and detail without departing from such principles.

For instance, one embodiment herein describes one or more rule sets that can be supplied to a type-checker or compiler such that the compiler or type-checker chooses one or more of the rule sets to type-check a language based on the language and/or phase of compilation being type-checked. However, in the alternative, a single set of rules can be supplied to a type-checker or compiler such that the compiler or type-checker constructs one or more subsets of rules from the single set of rules, either statically or dynamically at runtime, based on the language and/or phase of compilation being type-checked.

Additionally, any references to class definitions herein are made with the understanding that objects will be instantiated from the classes when a program containing the class definitions is executed on a computer such as that described in FIG. 9. In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

Appendix A

```
//---------------------------------------------------------------//
// Description:
//
//   IR types
//
//
//   Type Class Hierarchy        Description & Primary Properties Introduced
//   --------------------        -------------------------------------------
//   Phx::Type                   - Abstract base class for types
//     Phx::PtrType              - Pointer types
//     Phx::ContainerType        - Container types (types that have members)
//         Phx::ClassType        - Class types
//           Phx::MgdArrayType   - Managed array types
//         Phx::StructType       - Struct types
//         Phx::InterfaceType    - Interface types
//         Phx::EnumType         - Enumerated types
//     Phx::FuncType             - Function types
//                                 Properties: ArgTypes, ReturnType
//
//     Phx::UnmgdArrayType       - Unmanaged arrays
//                                 Properties: Dim, Referent
//
//---------------------------------------------------------------

//---------------------------------------------------------------
//
// Description:
//
//   Base class for IR types
//
//---------------------------------------------------------------

__abstract __public __gc
class Type : public Phx::Object
{ public:
```

```
// Functions for comparing types.

virtual Boolean IsAssignable(Phx::Type * srcType);
   virtual Boolean IsEqual(Phx::Type * type);

public:

// Public Properties

DEFINE_GET_PROPERTY(Phx::TypeKind,      TypeKind,     typeKind);
   DEFINE_GET_PROPERTY(Phx::SizeKind,      SizeKind,     sizeKind);
   DEFINE_GET_PROPERTY(Phx::BitSize,       BitSize,      bitSize);
   DEFINE_GET_PROPERTY(Symbols::ConstSym *, ConstSym,    constSym);
   DEFINE_GET_PROPERTY(Phx::ExternalType *, ExternalType, externalType);
   DEFINE_GET_PROPERTY(Phx::PrimTypeKindNum,              PrimTypeKind,
primTypeKind);
   GET_PROPERTY(Phx::TypeSystem *, TypeSystem);

protected:

// Protected Fields

Phx::TypeKind      typeKind;     // type classification
   Phx::SizeKind      sizeKind;     // size classification
   Phx::BitSize       bitSize;      // size in bits when constant
   Symbols::ConstSym * constSym;    // size in bits when symbolic
   Phx::PrimTypeKindNum primTypeKind;
   Phx::ExternalType * externalType;  // optionally null
};

//---------------------------------------------------------------
//
// Description:
//
//   Container Type - Abstract class for types that have members.
//
//---------------------------------------------------------------

__abstract __public __gc
class ContainerType : public QuantifiedType, public IScope
```

```
    {

DEFINE_PROPERTY(Symbols::FieldSym *, FieldSymList, fieldSymList);

private:

// Private Fields

Symbols::FieldSym * fieldSymList;

};

//-----------------------------------------------------------------
//
// Description:
//
//    Class Container Type
//
//-----------------------------------------------------------------

__public __gc
class ClassType : public ContainerType
{ public:

// Public Static Constructors static Phx::ClassType * New
    (
        Phx::TypeSystem *      typeSystem,
        Phx::BitSize           bitSize,
        Phx::ExternalType *    externalType
    );

public:

// Public Properties
```

```
    DEFINE_GET_PROPERTY(Phx::Type *, UnboxedType,    unboxedType);
    DEFINE_PROPERTY(   ClassType *, ExtendsClassType, extendsClassType);

DEFINE_GET_PROPERTY(Phx::Collections::InterfaceTypeList *,
      ExplicitlyImplements, explicitlyImplements);

protected:

// Protected Properties

DEFINE_SET_PROPERTY(Phx::Collections::InterfaceTypeList *,
      ExplicitlyImplements, explicitlyImplements);

private:

// Private Fields

Phx::Type *                 unboxedType;
    Phx::ClassType *            extendsClassType;
    Phx::Collections::InterfaceTypeList * explicitlyImplements;
};

//---------------------------------------------------------------------
//
// Class: StructType
//
// Description:
//
//    Type of structs.
//
//
//---------------------------------------------------------------------

__public __gc
class StructType : public ContainerType
{ public:

// Public Static Constructors
```

```
    static Phx::StructType * New
    (
      Phx::TypeSystem *      typeSystem,
      Phx::BitSize           bitSize,
      Phx::ExternalType *    externalType
    );
``` public:

// Public Properties

DEFINE_GET_PROPERTY(Phx::ClassType *, BoxedType, boxedType);

private:

// Private Fields

Phx::ClassType * boxedType;
};

//----------------------------------------------------------------
//
// Class: PrimType
//
// Description:
//
//     Primitive types
//
//----------------------------------------------------------------

__public __gc
class PrimType : public StructType
{ public:

// Public Static Constructors static Phx::PrimType *

```
  New
  (
    Phx::TypeSystem *      typeSystem,
    Phx::PrimTypeKindNum   primTypeKind,
    Phx::BitSize           bitSize,
    Phx::ExternalType *    externalType
  );

public:

// Public Methods static Phx::PrimType *
  GetScratch
  (
    Phx::PrimType * type,
    PrimTypeKindNum kind,
    Phx::BitSize bitSize
  );

Phx::PrimType * GetResized
  (
    Phx::BitSize bitSize
  );

public:

// Public Properties

DEFINE_GET_PROPERTY(Phx::TypeSystem *, TypeSystem, typeSystem);

private:

// Private Fields

Phx::TypeSystem * typeSystem;
};

//-----------------------------------------------------------------
//
```

```cpp
// Class: InterfaceType
//
// Description:
//
//    Interface types
//
//----------------------------------------------------------------

__public __gc
class InterfaceType : public ContainerType
{ public:

// Public Static Constructors static Phx::InterfaceType * New
   (
      Phx::TypeSystem *     typeSystem,
      Phx::ExternalType *   externalType
   );

public:

// Public Properties

DEFINE_PROPERTY(             Phx::ClassType   *,   ExtendsClassType,
extendsClassType);
   DEFINE_GET_PROPERTY(Phx::Collections::InterfaceTypeList *,
      ExplicitlyImplements, explicitlyImplements);

protected:

// Protected Properties

DEFINE_SET_PROPERTY(Phx::Collections::InterfaceTypeList *,
      ExplicitlyImplements, explicitlyImplements);

private:
```

```
// Private Fields

Phx::ClassType *                         extendsClassType;
    Phx::Collections::InterfaceTypeList * explicitlyImplements;
};

//------------------------------------------------------------------
//
// Class: EnumType
//
// Description:
//
//   Enumeration types
//
//------------------------------------------------------------------

__public __gc
class EnumType : public ContainerType
{ public:

// Public Static Constructors static Phx::EnumType * New
    (
        Phx::TypeSystem *      typeSystem,
        Phx::ExternalType *    externalType,
        Phx::Type *            underLyingType
    );

public:

// Public Properties

DEFINE_GET_PROPERTY(Phx::ClassType *, BoxedType, boxedType);
    DEFINE_GET_PROPERTY(Phx::Type *, UnderlyingType, underlyingType);

private:
```

```
// Private Fields

Phx::Type * underlyingType;
  Phx::ClassType * boxedType;
};
```

```
//----------------------------------------------------------------
//
// Class: MgdArrayType
//
// Description:
//
//     Managed array types.
//
//
//----------------------------------------------------------------

__public __gc
class MgdArrayType : public ClassType
{ public:

// Public Static Constructors static Phx::MgdArrayType * New
  (
    Phx::TypeSystem *      typeSystem,
    Phx::ExternalType *    externalType,
    Phx::Type *            elementType
  );

public:

// Public Properties

DEFINE_GET_PROPERTY(Phx::Type *,    ElementType, elementType);

private:
```

```
  // Private Fields

Phx::Type * elementType;
};

//----------------------------------------------------------------
//
// Class: UnmgdArrayType
//
// Description:
//
//    Unmanaged array types.
//
//
//----------------------------------------------------------------

__public __gc
class UnmgdArrayType : public Type
{ public:

// Public Static Constructors static Phx::UnmgdArrayType * New
  (
    Phx::TypeSystem *       typeSystem,
    Phx::BitSize            bitSize,
    Phx::ExternalType *     externalType,
    Phx::Type *             referentType
  );

public:

// Public Properties

DEFINE_GET_PROPERTY(int,       Dim,       dim);
  DEFINE_GET_PROPERTY(Phx::Type *, Referent,   referent);

private:
```

```
// Private Fields int       dim;
  Phx::Type * referent;
};
```

//------------------------------------------------------------
//
// Description:
//
//    Pointer types
//
//
//------------------------------------------------------------

```
__public __gc
class PtrType : public Type
{ public:

// Public Static Constructors static Phx::PtrType * New
  (
    Phx::TypeSystem *     typeSystem,
    Phx::PtrTypeKind      ptrTypeKind,
    Phx::BitSize          bitSize,
    Phx::Type *           referent,
    Phx::ExternalType *   externalType
  );

// Constructor without type pointed to.

static Phx::PtrType * New
  (
    Phx::TypeSystem *     typeSystem,
    Phx::PtrTypeKind      ptrTypeKind,
```

```
    Phx::BitSize         bitSize,
    Phx::ExternalType *  externalType
);
``` public:

// Public Properties

```
DEFINE_GET_PROPERTY(Phx::PtrTypeKind, PtrTypeKind, ptrTypeKind);
DEFINE_GET_PROPERTY(Phx::Type *,      Referent,    referent);
``` private:

// Private Fields

```
Phx::PtrTypeKind   ptrTypeKind;
Phx::Type *        referent;
};
```

//-----------------------------------------------------------------
//
// Enum: CallingConvention
//
// Description:
//
//   A preliminary enum to represent calling convention types.
//
//-----------------------------------------------------------------

```
BEGIN_ENUM(CallingConventionKind)
{
  _Illegal = 0,
  CLRCall,
  CDecl,
  StdCall,
  ThisCall,
  FastCall
}
END_ENUM(CallingConventionKind);
```

```
//----------------------------------------------------------------
//
// Class: FuncType
//
// Description:
//
//   Function types.
//
//
//----------------------------------------------------------------

__public __gc
class FuncType : public QuantifiedType
{ public:

// Public Static Constructors public:

// Public Methods

Int32       CountArgs();
    Int32       CountRets();
    Int32       CountArgsForInstr();
    Int32       CountRetsForInstr();
    Int32       CountUserDefinedArgs();
    Int32       CountUserDefinedRets();
    Phx::FuncArg * GetNthArgFuncArg(Int32 index);
    Phx::FuncArg * GetNthRetFuncArg(Int32 index);
    Phx::FuncArg * GetNthArgFuncArgForInstr(Int32 index);
    Phx::FuncArg * GetNthRetFuncArgForInstr(Int32 index);
    Phx::FuncArg * GetNthUserDefinedArgFuncArg(Int32 index);
    Phx::FuncArg * GetNthUserDefinedRetFuncArg(Int32 index);
    Phx::Type *    GetNthArgType(Int32 index);
    Phx::Type *    GetNthRetType(Int32 index);
    Phx::Type *    GetNthArgTypeForInstr(Int32 index);
    Phx::Type *    GetNthRetTypeForInstr(Int32 index);
    Phx::Type *    GetNthUserDefinedArgType(Int32 index);
```

```
    Phx::Type *   GetNthUserDefinedRetType(Int32 index);

public:

// Public Properties

DEFINE_GET_PROPERTY(Phx::CallingConventionKind,   CallingConvention,
callingConvention);
      GET_PROPERTY(Phx::Type *,   RetType);

// True if this function type has an ellipsis funcarg.

GET_PROPERTY(Boolean,   IsVarArgs);
   GET_PROPERTY(Boolean,   IsInstanceMethod);
   GET_PROPERTY(Boolean,   IsClrCall);
   GET_PROPERTY(Boolean,   IsCDecl);
   GET_PROPERTY(Boolean,   IsStdCall);
   GET_PROPERTY(Boolean,   IsThisCall);
   GET_PROPERTY(Boolean,   IsFastCall);

// Not True if this function has a return value.

GET_PROPERTY(Boolean,   ReturnsVoid);

protected:

// Protected Fields

Phx::CallingConventionKind   callingConvention;
   Phx::FuncArg *               argFuncArgs;
   Phx::FuncArg *               retFuncArgs;
};

//--------------------------------------------------------------------------
//
// Description:
//
//    The global type system used during compilation.
//
//
```

```
//----------------------------------------------------------------

__public __gc
class TypeSystem : public Phx::Object
{ public:

// Public Static Constructors static TypeSystem *
    New
    (
       Phx::BitSize     regIntBitSize,
       Phx::BitSize     nativeIntBitSize,
       Phx::BitSize     nativePtrBitSize,
       Phx::BitSize     nativeFloatBitSize,
    );

public:

// Public Methods void Add(Type * type);

public:

// lists of created types

DEFINE_GET_PROPERTY(Phx::Type *, AllTypes,     allTypes);

private:

// List of all types in the system.

Phx::Type * allTypes;
};
//----------------------------------------------------------------
//
```

// Description:
//
//   Various enums to describe types.
//
//----------------------------------------------------------------

// Classes and value types for IR types

// The different kinds of types.

BEGIN_ENUM(TypeKind)
{
  _Illegal = 0,
  Class,
  Struct,
  Interface,
  Enum,
  MgdArray,
  UnmgdArray,
  Ptr,
  Func,
  Variable,
  Quantifier,
  Application,
  TypedRef,
}
END_ENUM(TypeKind);

// The different kinds of type sizes.

BEGIN_ENUM(SizeKind)
{
  _Illegal = 0,
  Constant,
  Symbolic,
  Unknown
}
END_ENUM(SizeKind);

// The different types of pointers

```
BEGIN_ENUM(PtrTypeKind)
{
  _Illegal = 0,
  ObjPtr,          // __gc pointer to object whole.
  MgdPtr,          // __gc pointer to object interior.
  UnmgdPtr,        // __nogc pointer.
  NullPtr,         // pointer to nothing.
  _NumPtrTypeKinds
}
END_ENUM(PtrTypeKind);
}
```

We claim:

1. A method, implemented at least in part by a computing device comprising a processing unit and memory, of representing type information for a typed intermediate language via objects of classes in a class hierarchy, wherein the class hierarchy comprises at least one class and a plurality of sub-classes for representing different type classifications, the method comprising:

with the computing device:
instantiating one or more objects of one or more of the sub-classes of the hierarchy, wherein the one or more sub-classes represent classifications of types for the typed intermediate language; and
storing information in the one or more objects;
wherein the typed intermediate language is capable of representing a plurality of different programming languages, and wherein the one or more objects represent type information for instructions in the typed intermediate language;
wherein the classifications of types comprises a primitive type associated with a primitive type size, and wherein the primitive type size is settable to represent a constant size, the primitive type size is settable to represent a symbolic size, and the primitive type size is settable to represent an unknown size; and
wherein one of the sub-classes representing a primitive type represents an unknown type, wherein the unknown type can represent any type, wherein the unknown type represents a lack of all type information, wherein a compiler drops type information by changing a known type to the unknown type during a stage of lowering, wherein the unknown type is set independently of the primitive type size, and wherein the classifications of types support an unknown type with an unknown primitive type size.

2. The method of claim 1 wherein at least one of the objects comprises information for a size of a type represented by the object.

3. The method of claim 1 wherein at least one of the one or more sub-classes inherits from an abstract type that wraps an externally defined type, the abstract type providing a mapping from the typed intermediate language to original source code.

4. The method of claim 1 wherein at least one of the one or more sub-classes represents container types.

5. The method of claim 1 wherein at least one of the one or more sub-classes represents pointer types.

6. The method of claim 1 wherein at least one of the one or more sub-classes represents function types.

7. The method of claim 1 wherein at least one of the one or more sub-classes represents unmanaged array types.

8. The method of claim 1 wherein at least one of the one or more sub-classes represents class types.

9. The method of claim 1 wherein at least one of the one or more sub-classes represents managed array types.

10. The method of claim 1 wherein at least one of the one or more sub-classes represents struct types.

11. The method of claim 1 wherein at least one of the one or more sub-classes represents interface types.

12. The method of claim 1 wherein at least one of the one or more sub-classes represents enumerated types.

13. The method of claim 1 wherein at least one of the sub-classes representing primitive types represents the following types: int, float, and void.

14. The method of claim 1 wherein at least one of the sub-classes representing primitive types is extensible to represent one or more additional primitive types.

15. The method of claim 1 wherein at least one of the one or more sub-classes is defined from the group consisting of: 'ContainerType', 'PtrType', 'FuncType', 'ClassType', 'StructType', 'InterfaceType', and 'EnumType'.

16. The method of claim 1 wherein at least one of the one or more sub-classes is defined as 'PrimType'.

17. A computer-readable medium storing a software program thereon, the program comprising computer executable instructions for implementing a method for representing type information for a typed intermediate language using a class hierarchy for representing different type classifications, the method comprising:

defining a programming class of the class hierarchy as 'PrimType', wherein the programming class represents primitive type information for the typed intermediate language;
associating a size with instances of the 'PrimType' class, wherein the size is settable to represent an actual size of instances of the 'PrimType' class, settable to represent a symbolic size of instances of the 'PrimType' class, and settable to represent an unknown size of instances of the 'PrimType' class, and wherein the actual size and the symbolic size are defined as a number of bits; and
associating a kind of type with instances of the 'PrimType' class;
wherein the class 'PrimType' represents a plurality of types comprising at least an unknown type, wherein the unknown type can represent any type, wherein the unknown type represents a lack of all type information, wherein a compiler drops type information during compilation by changing a known type to the unknown type, in the typed intermediate language, during a stage of lowering, wherein the unknown type is set independently of the size, and wherein the 'PrimType' class supports an unknown type with an unknown size.

18. The computer-readable medium of claim 17 wherein the size represents a size of a machine representation of a value.

19. The computer-readable medium of claim 17 wherein the kind of type represents a type classification.

20. The computer-readable medium of claim 17 wherein associating a kind of primitive type with instances of the 'PrimType' class comprises defining the kind of type as 'PrimTypekind'.

21. The computer-readable medium of claim 17 wherein associating a type of size with instances of the 'PrimType' class comprises defining the type of size as 'SizeKind'.

22. The computer-readable medium of claim 17 wherein the class 'PrimType' further represents int, float, void, condition code, and unsigned int types.

23. A method, implemented at least in part by a computing device comprising a processing unit and memory, for representing type information for a typed intermediate language using a class hierarchy by programmatically defining a type representation, the method comprising:

with the computing device:
defining a base class of the class hierarchy;
defining a plurality of classes hierarchically below the base class, wherein the plurality of classes represent type information for the typed intermediate language, and wherein the plurality of classes represent at least pointer types, container types and function types of a plurality of programming languages, and wherein the plurality of classes further comprise primitive types and the primitive types are associated with a primitive type size settable to represent a constant size, settable to represent a symbolic size, and settable to represent an unknown size;

wherein one of the primitive types represents an unknown type, wherein the unknown type can represent any type, wherein the unknown type represents a lack of all type information, wherein a compiler drops type information by changing a known type to the unknown type during a stage of lowering, wherein the unknown type is set independently of the primitive type size, and wherein the plurality of classes support an unknown type with an unknown primitive type size.

24. The method of claim 23 further comprising defining a plurality of classes hierarchically below the class representing container types, wherein the plurality of classes represent type information for the typed intermediate language, and wherein the plurality of classes represent at least class types, struct types, interface types, and enumerated types of a plurality of programming languages.

25. The method of claim 24 further comprising defining a class hierarchically below the class representing class types, wherein the class represents type information for the typed intermediate language, and wherein the class represents unmanaged array types of a plurality of programming languages.

26. The method of claim 23 further comprising defining a class hierarchically below one of the plurality of classes, wherein the class represents type information for the typed intermediate language.

27. A computer-readable medium storing a software program thereon, the program comprising computer executable instructions for implementing a method for representing type information for a typed intermediate language using a class hierarchy for representing different type classifications, the method comprising:

defining a programming class of the class hierarchy as 'ContainerType', wherein an object of class 'ContainerType' is a type representation for the typed intermediate language for container types in a section of code written in one of a plurality of programming languages;

defining a programming class of the class hierarchy as 'PtrType', wherein an object of class 'PtrType' is a type representation for the typed intermediate language for pointer types in a section of code written in one of a plurality of programming languages;

defining a programming class of the class hierarchy as 'FuncType', wherein an object of class 'FuncType' is a type representation for the typed intermediate language for function types in a section of code written in one of a plurality of programming languages;

defining a programming class of the class hierarchy as 'ClassType', wherein an object of class 'ClassType' is a type representation for the typed intermediate language for class types in a section of code written in one of a plurality of programming languages;

defining a programming class of the class hierarchy as 'StructType', wherein an object of class 'StructType' is a type representation for the typed intermediate language for struct types in a section of code written in one of a plurality of programming languages;

defining a programming class of the class hierarchy as 'InterfaceType', wherein an object of class 'InterfaceType' is a type representation for the typed intermediate language for interface types in a section of code written in one of a plurality of programming languages;

defining a programming class of the class hierarchy as 'EnumType', wherein an object of class 'EnumType' is a type representation for the typed intermediate language for enumerated types in a section of code written in one of a plurality of programming languages; and defining a programming class of the class hierarchy as 'PrimType', wherein an object of class 'PrimType' is a type representation for the typed intermediate language for primitive types in a section of code written in one of a plurality of programming languages;

wherein the object of class 'PrimType' is associated with a size settable to represent a constant size for the object of class 'PrimType', settable to represent a symbolic size for the object of class 'PrimType', and settable to represent an unknown size for the object of class 'PrimType'; and wherein the class 'PrimType' represents a plurality of types comprising at least an unknown type, wherein the unknown type can represent any type, wherein the unknown type represents a lack of all type information, wherein a compiler drops type information by changing a known type to the unknown type during a stage of lowering, wherein the unknown type is set independently of the size, and wherein the 'PrimType' class supports an unknown type with an unknown size.

28. The computer-readable medium storing a software program thereon, the program comprising computer executable instructions for implementing a method, of claim 27 wherein the method further comprises program code for associating a size with an object of any class.

29. The computer-readable medium storing a software program thereon, the program comprising computer executable instructions for implementing a method, of claim 27 wherein the method further comprises program code for associating a kind of type with an object of any class.

* * * * *